(12) United States Patent
Taniguchi et al.

(10) Patent No.: US 10,848,041 B2
(45) Date of Patent: Nov. 24, 2020

(54) ROTATING ELECTRIC MACHINE

(71) Applicant: DENSO CORPORATION, Kariya (JP)

(72) Inventors: Makoto Taniguchi, Kariya (JP); Yuuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/506,364

(22) Filed: Jul. 9, 2019

(65) Prior Publication Data
US 2019/0334425 A1    Oct. 31, 2019

Related U.S. Application Data

(63) Continuation of application No. PCT/JP2018/000560, filed on Jan. 12, 2018.

(30) Foreign Application Priority Data

Jan. 13, 2017  (JP) ................... 2017-004369

(51) Int. Cl.
*H02K 21/12* (2006.01)
*H02K 21/04* (2006.01)
*H02K 1/22* (2006.01)

(52) U.S. Cl.
CPC ........... *H02K 21/044* (2013.01); *H02K 1/226* (2013.01)

(58) Field of Classification Search
CPC .. H02K 21/044; H02K 1/243; H02K 2213/03; H02K 1/226; H02K 3/325; H02K 3/528; H02K 15/022
USPC ................... 310/156.66–156.73, 263
See application file for complete search history.

(56) References Cited

U.S. PATENT DOCUMENTS

| | | | | |
|---|---|---|---|---|
| 5,973,435 A | * | 10/1999 | Irie ...................... | H02K 21/044 310/216.126 |
| 6,114,793 A | * | 9/2000 | Asao ...................... | H02K 9/06 310/263 |
| 2007/0262672 A1 | * | 11/2007 | Maekawa ............ | H02K 21/044 310/263 |
| 2009/0218907 A1 | | 9/2009 | Kusase | |
| 2010/0052456 A1 | | 3/2010 | Hamada | |
| 2011/0084634 A1 | | 4/2011 | Kusase | |

(Continued)

FOREIGN PATENT DOCUMENTS

JP          H04-255451 A     9/1992

*Primary Examiner* — Thanh Lam
(74) *Attorney, Agent, or Firm* — Oliff PLC

(57) ABSTRACT

A rotating electric machine includes a stator and a rotor. The rotor includes: a field core having at least one boss portion, a pair of disc portions and a plurality of claw-shaped magnetic pole portions; a field coil arranged between the at least one boss portion and the claw-shaped magnetic pole portions; a plurality of permanent magnets each of which is arranged between one circumferentially-adjacent pair of the claw-shaped magnetic pole portions; and a ring-shaped fixing member fixed to radially inner parts of the claw-shaped magnetic pole portions to support the claw-shaped magnetic pole portions from the radially inner side. Moreover, a d-axis magnetic circuit and a magnet magnetic circuit are at least partially coincident with each other to share a common circuit portion. When field current is supplied to the field coil, the permeance of the d-axis magnetic circuit is lower than the permeance of a q-axis magnetic circuit.

20 Claims, 8 Drawing Sheets

(56) References Cited

U.S. PATENT DOCUMENTS

2014/0042858 A1    2/2014  Tsuchiya et al.
2019/0131833 A1    5/2019  Takahashi et al.
2019/0334424 A1*  10/2019  Takahashi ................ H02K 1/27
2019/0356204 A1*  11/2019  Takahashi ................ H02K 1/24

\* cited by examiner

CONDITIONS
Ab=Ad=At
At=Ab−Hdg/2 × Wrr
2 × Br × Am=B50 × Ab
Db/Dr=0.515

CONDITIONS
Ab=Ad=At
At=Ab−Hdg/2 × Wrr
2 × Br × Am=B50 × Ab

ROTATING ELECTRIC MACHINE

CROSS-REFERENCE TO RELATED APPLICATIONS

The present application is a continuation application of International Application No. PCT/JP2018/000560 filed on Jan. 12, 2018, which is based on and claims priority from Japanese Patent Application No. 2017-4369 filed on Jan. 13, 2017. The contents of these applications are hereby incorporated by reference in their entirety into the present application.

BACKGROUND

1 Technical Field

The present disclosure relates to rotating electric machines.

2 Description of Related Art

Conventionally, rotating electric machines have been known which include a stator and a rotor. The rotor includes a field core, a field coil and a plurality of permanent magnets.

The field core has: at least one cylindrical boss portion fixed on a rotating shaft; a pair of disc portions extending radially outward respectively from two axial end parts of the at least one boss portion; and a plurality of claw-shaped magnetic pole portions each axially extending from a radially outer end part of a corresponding one of the disc portions and located radially outside the at least one boss portion.

The claw-shaped magnetic pole portions are provided at a predetermined angular pitch around the rotating shaft. The claw-shaped magnetic pole portions respectively form magnetic poles the polarities of which are alternately different in a circumferential direction. The field coil is arranged between the at least one boss portion and the claw-shaped magnetic pole portions to generate magnetomotive force upon being energized.

Each of the permanent magnets is arranged between one circumferentially-adjacent pair of the claw-shaped magnetic pole portions with its axis of easy magnetization oriented in the circumferential direction. The magnetic poles of each of the permanent magnets are formed so as to match the polarities induced in the pair of claw-shaped magnetic pole portions due to the magnetomotive force of the field coil.

Each of the permanent magnets forms two magnet magnetic circuits, i.e., a first magnet magnetic circuit along which magnetic flux flows to cross the stator and a second magnet magnetic circuit along which magnetic flux flows to circulate within the rotor through the at least one boss portion. Moreover, when the rotor is loaded (i.e., when field current is supplied to the field coil), a d-axis magnetic circuit is formed along which magnetic flux generated by the magnetomotive force of the field coil flows through the at least one boss portion, the disc portions and one pair of the claw-shaped magnetic pole portions of the field core and the stator core. Of the two magnet magnetic circuits, the direction of the magnet magnetic flux flowing along the second magnet magnetic circuit is opposite to the direction of the magnetic flux flowing along the d-axis magnetic circuit; therefore, the reluctance of the second magnet magnetic circuit is high and thus it is difficult for the magnet magnetic flux to flow through the second magnet magnetic circuit.

Setting the permeance Prt of the d-axis magnetic circuit and the permeance Pst of a q-axis magnetic circuit to satisfy the relationship of Pst>Prt, the magnet magnetic flux flowing along the first magnet magnetic circuit is increased; therefore, it is possible to significantly improve the electric power generation capability by effectively utilizing the magnet magnetic flux generated by the permanent magnets. As a specific means for realizing this, one may consider forming the claw-shaped magnetic pole portions and the disc portions integrally using a first soft-magnetic material while forming the at least one boss portion separately from the claw-shaped magnetic pole portions and the disc portions using a second soft-magnetic material that has a lower permeance coefficient than the first soft-magnetic material. In this case, the rotor core would be three-piece structured to include one boss member and a pair of pole members each having a plurality of claw-shaped magnetic pole portions and one disc portion integrated thereinto; the rotor core would be supported and fixed by having the rotating shaft penetrating it.

Alternatively, one may consider assembling together a pair of pole cores, each of which is obtained by forming a plurality of claw-shaped magnetic pole portions, one disc portion and one boss portion integrally using the same soft-magnetic material, and narrowing the boss portions or part or all of the disc portions of the pole cores to reduce the magnetic path cross-sectional area and thereby facilitate magnetic saturation.

According to the above methods, it would become difficult for the magnet magnetic flux generated by the permanent magnets to flow through the boss portion side; thus it would become easy for the magnet magnetic flux to cross the stator.

SUMMARY

A first rotating electric machine according to the present disclosure includes: a stator including an annular stator core and a stator coil wound on the stator core; and a rotor arranged radially inside the stator to radially face the stator. The rotor includes: a field core having at least one cylindrical boss portion fixed on a rotating shaft, a pair of disc portions extending radially outward respectively from two axial end parts of the at least one boss portion, and a plurality of claw-shaped magnetic pole portions each axially extending from a radially outer end part of a corresponding one of the disc portions and located radially outside the at least one boss portion, the claw-shaped magnetic pole portions respectively forming magnetic poles polarities of which are alternately different in a circumferential direction; a field coil arranged between the at least one boss portion and the claw-shaped magnetic pole portions to generate magnetomotive force upon being energized; a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions due to the magnetomotive force of the field coil; and a ring-shaped fixing member fixed to radially inner parts of the claw-shaped magnetic pole portions, which face the at least one boss portion, to support the claw-shaped magnetic pole portions from a radially inner side. A d-axis magnetic circuit and a magnet magnetic circuit are at least partially coincident with each other to share a common circuit portion. Along the d-axis magnetic circuit, magnetic flux generated by the magnetomotive force of the field coil flows through the at least one boss portion, the disc portions, one pair of the claw-shaped magnetic pole portions and the stator core. Along the magnet magnetic circuit, magnetic flux generated by magnetic force of a corresponding one of the permanent magnets flows. The rotating electric machine is configured so that when field current is supplied to the field coil, the permeance of the d-axis magnetic circuit is lower than the permeance of a q-axis magnetic circuit. Along the q-axis magnetic circuit, magnetic flux generated during energization of the stator coil flows through a q axis that is located at a position offset from a d axis by 90° in electrical angle.

A second rotating electric machine according to the present disclosure includes: a stator including an annular stator core and a stator coil wound on the stator core; and a rotor arranged radially inside the stator to radially face the stator. The rotor includes: a field core having at least one cylindrical boss portion fixed on a rotating shaft, a pair of disc portions extending radially outward respectively from two axial end parts of the at least one boss portion, and a plurality of claw-shaped magnetic pole portions each axially extending from a radially outer end part of a corresponding one of the disc portions and located radially outside the at least one boss portion, the claw-shaped magnetic pole portions respectively forming magnetic poles polarities of which are alternately different in a circumferential direction; a field coil arranged between the at least one boss portion and the claw-shaped magnetic pole portions to generate magnetomotive force upon being energized; a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions due to the magnetomotive force of the field coil; and a ring-shaped fixing member fixed to radially inner parts of the claw-shaped magnetic pole portions, which face the at least one boss portion, to support the claw-shaped magnetic pole portions from a radially inner side. Moreover, a surface area As of a radially outer surface of each of the claw-shaped magnetic pole portions and a magnetic path cross-sectional area Ab of the at least one boss portion per pair of N and S magnetic poles are set to satisfy the relationship of $0.9<As/Ab<1.7$.

A third rotating electric machine according to the present disclosure includes: a stator including an annular stator core and a stator coil wound on the stator core; and a rotor arranged radially inside the stator to radially face the stator. The rotor includes: a field core having at least one cylindrical boss portion fixed on a rotating shaft, a pair of disc portions extending radially outward respectively from two axial end parts of the at least one boss portion, and a plurality of claw-shaped magnetic pole portions each axially extending from a radially outer end part of a corresponding one of the disc portions and located radially outside the at least one boss portion, the claw-shaped magnetic pole portions respectively forming magnetic poles polarities of which are alternately different in a circumferential direction; a field coil arranged between the at least one boss portion and the claw-shaped magnetic pole portions to generate magnetomotive force upon being energized; a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions due to the magnetomotive force of the field coil; and a ring-shaped fixing member fixed to radially inner parts of the claw-shaped magnetic pole portions, which face the at least one boss portion, to support the claw-shaped magnetic pole portions from a radially inner side. Moreover, a surface area As of a radially outer surface of each of the claw-shaped magnetic pole portions and a magnetic path cross-sectional area Ad of each of the disc portions per claw-shaped magnetic pole portion are set to satisfy a relationship of $0.9<As/Ad<1.7$.

A fourth rotating electric machine according to the present disclosure includes: a stator including an annular stator core and a stator coil wound on the stator core; and a rotor arranged radially inside the stator to radially face the stator. The rotor includes: a field core having at least one cylindrical boss portion fixed on a rotating shaft, a pair of disc portions extending radially outward respectively from two axial end parts of the at least one boss portion, and a plurality of claw-shaped magnetic pole portions each axially extending from a radially outer end part of a corresponding one of the disc portions and located radially outside the at least one boss portion, the claw-shaped magnetic pole portions respectively forming magnetic poles polarities of which are alternately different in a circumferential direction; a field coil arranged between the at least one boss portion and the claw-shaped magnetic pole portions to generate magnetomotive force upon being energized; a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions due to the magnetomotive force of the field coil; and a ring-shaped fixing member fixed to radially inner parts of the claw-shaped magnetic pole portions, which face the at least one boss portion, to support the claw-shaped magnetic pole portions from a radially inner side.

DESCRIPTION OF EMBODIMENTS

Figure 1:
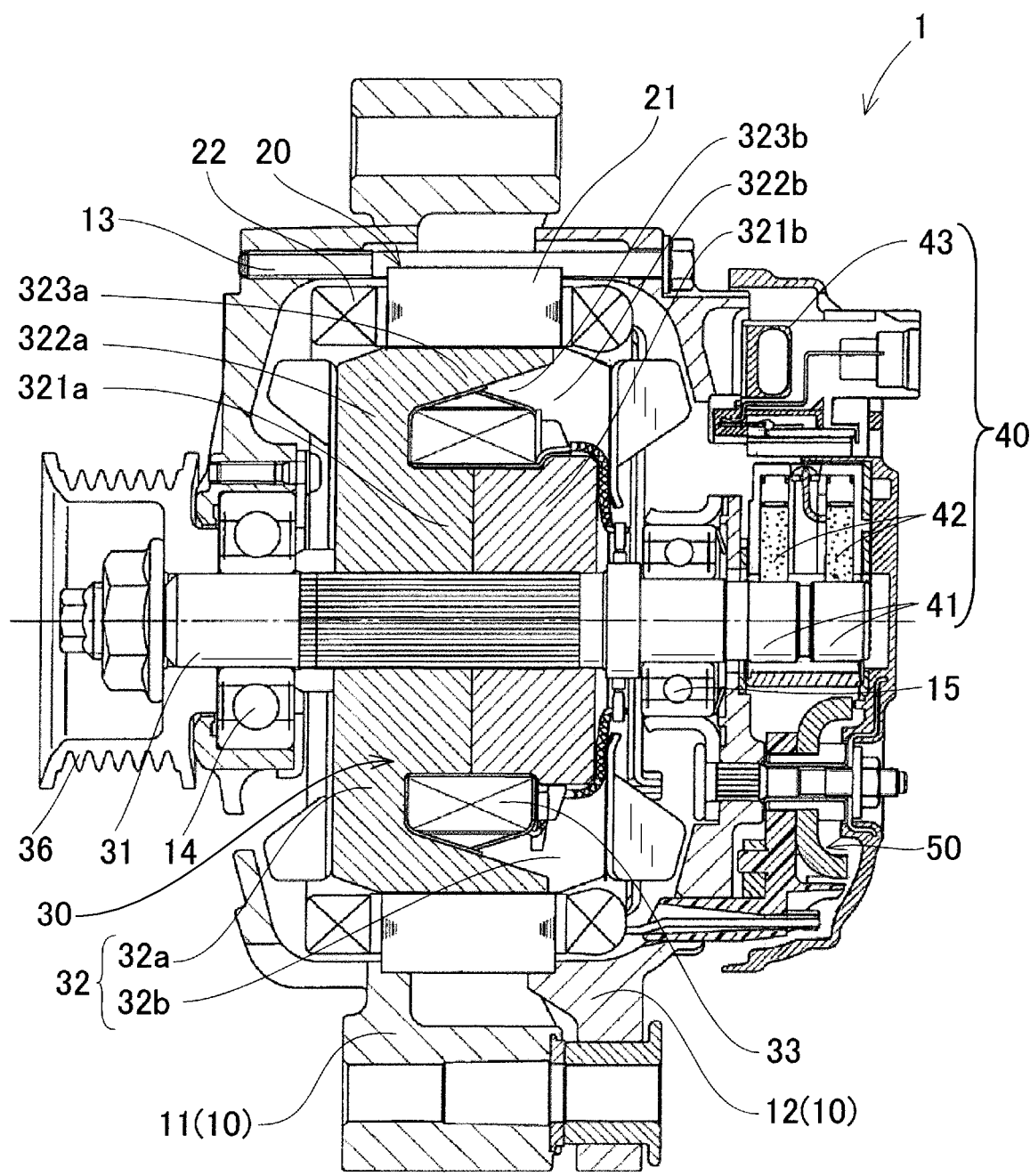
FIG. 1 is a cross-sectional view, along an axial direction, of a rotating electric machine according to an embodiment.

In a rotating electric machine according to the prior art (see, for example, Japanese Patent Application Publication No. JPH04255451A), the disc portions of a field core are generally required to have a supporting function capable of withstanding the centrifugal force which is generated during high-speed rotation of the rotor and acts on the claw-shape magnetic pole portions and the permanent magnets. However, in the case of a rotor core having the above-described three-piece structure, the holding of the disc portions relies only on the rotating shaft. Consequently, the rigidity of the disc portions may be lowered and thus it may become impossible for the disc portions to withstand the centrifugal force acting on the claw-shape magnetic pole portions and the permanent magnets. Moreover, in the case of the magnetic path cross-sectional area of the at least one boss portion or the disc portions being small, the same problems may occur, i.e., the rigidity of the disc portions may be lowered and thus it may become impossible for the disc portions to withstand the centrifugal force acting on the claw-shape magnetic pole portions and the permanent magnets. Moreover, in the case of the outer diameter of the at least one boss portion being small, the radial length of the disc portions would be accordingly increased; consequently, the bending moment caused by the centrifugal force would be large, lowering the resistance to the centrifugal force.

Therefore, during operation of the rotating electric machine, the maximum rotational speed may be suppressed to be low for the sake of fail-safe operation. Otherwise, the air gap between the stator and the rotor may be set to be large for preventing interference between the rotor field core and the stator. However, in these cases, the performance of the rotating electric machine may be lowered or the size of the rotating electric machine may become large.

In contrast, in the above-described first rotating electric machine according to the present disclosure, by the magnetic force of each of the permanent magnets which is arranged between one circumferentially-adjacent pair of the claw-shaped magnetic pole portions, there are formed two magnet magnetic circuits, i.e., a first magnet magnetic circuit along which magnetic flux flows to cross the stator and a second magnet magnetic circuit along which magnetic flux flows to circulate within the rotor through the at least one boss portion. Moreover, when the rotor is loaded, i.e., when the field current is supplied to the field coil, there is formed the d-axis magnetic circuit along which the magnetic flux generated by the magnetomotive force of the field coil flows through the at least one boss portion of the field core, one pair of the claw-shaped magnetic pole portions and the stator core. At this time, of the two magnet magnetic circuits, the direction of the magnet magnetic flux flowing along the second magnet magnetic circuit is opposite to the direction of the magnetic flux flowing along the d-axis magnetic circuit; therefore, the reluctance of the second magnet magnetic circuit is high and thus it is difficult for the magnet magnetic flux to flow through the second magnet magnetic circuit. Moreover, since the permeance Prt of the d-axis magnetic circuit is lower than the permeance Pst of the q-axis magnetic circuit, the magnet magnetic flux flowing along the first magnet magnetic circuit to cross the stator is increased. Consequently, it becomes possible to effectively utilize the magnet magnetic flux, thereby significantly improving the electric power generation capability. Furthermore, since there is the ring-shaped fixing member fixed to the radially inner parts of the claw-shaped magnetic pole portions which face the at least one boss portion, it is possible to suppress, with the fixing member, deformation in which the claw-shaped magnetic pole portions are moved radially outward due to the centrifugal force generated during rotation of the rotor. Consequently, it is possible to improve the resistance to the centrifugal force acting on the claw-shaped magnetic pole portions and the permanent magnets, thereby preventing performance degradation and increase in size of the rotor.

In a further implementation of the above-described first rotating electric machine, the permeance Prt of the d-axis magnetic circuit and the permeance Pst of the q-axis magnetic circuit are set to satisfy the relationship of Pst:Prt=2n:1 (where n is a real number greater than or equal to 1) when the field current is supplied to the field coil. With this configuration, it is possible to make the mode of the Lundell rotor when loaded approach the mode of an IPM rotor; thus it is possible to make the salient pole ratio ρ, which is the ratio Lq/Ld between the q-axis inductance Lq and the d-axis inductance Ld, greater than or equal to 2. As a result, it is possible for the Lundell rotor to output reluctance torque at the same level as that outputted by an IPM rotor.

In the above-described second rotating electric machine according to the present disclosure, since the fixing member supports the claw-shaped magnetic pole portions from the radially inner side, it is possible to suppress the claw-shaped magnetic pole portions from being deformed to spread radially outward even if the magnetic path cross-sectional area Ab of the at least one boss portion is smaller than the conventional level and the rigidity of the at least one boss portion against the centrifugal force acting on the claw-shaped magnetic pole portions and the permanent magnets is lowered. Moreover, since the surface area As of the radially outer surface of each of the claw-shaped magnetic pole portions and the magnetic path cross-sectional area Ab of the at least one boss portion per pair of N and S magnetic poles are set to satisfy the relationship of 0.9<As/Ab<1.7, it is possible to increase the magnet magnetic flux flowing along the first magnet magnetic circuit. Consequently, it is possible to effectively utilize the magnet magnetic flux, thereby significantly improving the electric power generation capability. Furthermore, it is possible to use the permanent magnets, which have conventionally been used for rectification or leakage prevention of magnetic flux between the adjacent claw-shaped magnetic pole portions, similarly to permanent magnets of an IPM rotor. In other words, it is possible to use the permanent magnets not only as leakage prevention means, but also as magnetic flux increasing means, i.e., as torque increasing means and output increasing means.

In a further implementation of the above-described second rotating electric machine, an outer diameter Db of the at least one boss portion and an outer diameter Dr of the rotor are set to satisfy the relationship of 0.46<Db/Dr<0.53. With this configuration, the boss portion cross-sectional area Ab is in a range determined by fully considering the reaction of the magnet magnetic force to the magnetic force of the at least one boss portion. Consequently, when the magnetic force of the at least one boss portion, which can repel the reaction by the magnet magnetic force, acts on the field core, it is possible to transfer both the total magnetic force of the at least one boss portion and the total magnetic force of the magnets to the stator side.

In the above-described third rotating electric machine according to the present disclosure, since the fixing member supports the claw-shaped magnetic pole portions from the radially inner side, it is possible to suppress the claw-shaped magnetic pole portions from being deformed to spread radially outward even if the magnetic path cross-sectional area Ad of the disc portions is smaller than the conventional level and the rigidity of the disc portions against the centrifugal force acting on the claw-shaped magnetic pole portions and the permanent magnets is lowered. Moreover, since the surface area As of the radially outer surface of each of the claw-shaped magnetic pole portions and the magnetic path cross-sectional area Ad of each of the disc portions per claw-shaped magnetic pole portion are set to satisfy the relationship of 0.9<As/Ad<1.7, it is possible to increase the magnet magnetic flux flowing along the first magnet magnetic circuit. Consequently, it is possible to effectively utilize the magnet magnetic flux, thereby significantly improving the electric power generation capability. Furthermore, it is possible to use the permanent magnets, which have conventionally been used for rectification or leakage prevention of magnetic flux between the adjacent claw-shaped magnetic pole portions, similarly to permanent magnets of an IPM rotor. In other words, it is possible to use the permanent magnets not only as leakage prevention means, but also as magnetic flux increasing means, i.e., as torque increasing means and output increasing means.

In a further implementation of the above-described second and third rotating electric machines, the residual magnetic flux density of the permanent magnets is higher than or equal to 1T. With this configuration, it is possible to more effectively achieve the above-described operational effects.

In a further implementation of the above-described first, second and third rotating electric machines, the magnetic path cross-sectional area Ab of the at least one boss portion per pair of N and S magnetic poles, magnetic flux density B50 when magnetic field of 5000 A/m is applied to the at least one boss portion, the residual magnetic flux density Br of the permanent magnets, and a magnetic path cross-sectional area Am of each of the permanent magnets are set to satisfy a relationship of 2×Br×Am<B50×Ab. With this configuration, it is possible for the magnetic force generated by each of the permanent magnets to be absorbed by the d-axis magnetic circuit. Consequently, it is possible to lower the counterelectromotive force, thereby suppressing electric power generated in a high-speed rotation state during non-energization.

In another further implementation of the above-described first, second and third rotating electric machines, the claw-shaped magnetic pole portions of the field core are formed of a first material; the at least one boss portion and the disc portions of the field core are formed of a second material that is lower in saturation flux density than the first material. With this configuration, the at least one boss portion can be magnetically saturated earlier than the claw-shaped magnetic pole portions and the disc portions and thus the behavior of magnetic flux characteristics of the rotor can be easily changed to that of an IPM rotor. As a result, it is possible to more reliably improve the electric power generation capability of the rotating electric machine.

Moreover, the second material is higher in magnetic permeability than the first material. With this configuration, it is possible to improve the capability of absorbing the counterelectromotive force when no load is applied to the rotor.

In a still further implementation of the above-described first, second and third rotating electric machines, the fixing member is formed in an annular shape such that outer diameters of fixing portions of the fixing member, which are respectively fixed to the claw-shaped magnetic pole portions, are constant over an entire circumferential range of the fixing member. With this configuration, it is possible to simplify the shape of the fixing member; it is also possible to facilitate the workability in fixing the fixing member to the claw-shaped magnetic pole portions.

In the above-described fourth rotating electric machine according to the present disclosure, since there is the ring-shaped fixing member fixed to the radially inner parts of the claw-shaped magnetic pole portions which face the at least one boss portion, it is possible to suppress, with the fixing member, deformation in which the claw-shaped magnetic pole portions are moved radially outward due to the centrifugal force generated during rotation of the rotor. Consequently, it is possible to improve the resistance to the centrifugal force acting on the claw-shaped magnetic pole portions and the permanent magnets, thereby preventing performance degradation and increase in size of the rotor.

Hereinafter, an exemplary embodiment and modifications thereof will be described with reference to FIGS. 1-15.

In the present embodiment, a rotating electric machine 1 is mounted in, for example, a vehicle. The rotating electric machine 1 generates drive power for driving the vehicle upon being supplied with electric power from an electric power source such as a battery. Moreover, the rotating electric machine 1 generates electric power for charging the battery upon being supplied with mechanical power from an engine of the vehicle. That is, the rotating electric machine 1 is configured as a motor-generator for a vehicle. As shown in FIG. 1, the rotating electric machine 1 includes a housing 10, a stator 20, a rotor 30, a field coil energization device 40 and a rectifier 50.

The housing 10 consists of a front housing 11 and a rear housing 12. The front and rear housings 11 and 12 are each formed in a bottomed cylindrical shape having one end open. The front and rear housings 11 and 12 are fastened together, by bolts 13, with the open ends thereof abutting each other.

The stator 20 includes a stator core 21 and a stator coil 22. The stator core 21 is formed in an annular shape. The stator core 21 has a plurality of teeth 23, a plurality of slots 24 and an annular back core 25 (see FIG. 11). The teeth 23 extend radially inward from the back core 25 and are arranged at predetermined intervals in a circumferential direction. Each of the slots 24 is formed between one circumferentially-adjacent pair of the teeth 23. The stator core 21 is fixed to radially inner wall surfaces of the front and rear housings 11 and 12 as well as axially sandwiched between the front and rear housings 11 and 12.

The stator coil 22 is wound on the stator core 21 (more specifically, on the teeth 23). The stator coil 22 has slot-accommodated parts accommodated in the slots 24 of the stator core 21 and a pair of coil end parts protruding axially outward respectively from two axial ends of the stator core 21. The stator coil 22 is a multi-phase coil (e.g., three-phase coil). Each phase winding of the stator coil 22 is connected to an inverter device (not shown). The voltage applied to each phase winding is controlled by turning on and off switching elements provided in the inverter device.

The rotor 30 is arranged radially inside the stator 20 (more specifically, the distal ends of the teeth 23) to radially face the stator 20. Between the rotor 30 and the stator 20, there is provided a predetermined air gap. That is, the rotor 30 is rotatably provided radially inside the stator 20.

The rotor 30 is a so-called Lundell rotor. The rotor 30 includes a rotating shaft 31, a field core 32, a field coil 33, a plurality of permanent magnets 34 and a ring member 35. The rotating shaft 31 is rotatably supported by the housing 10 via a pair of bearings 14 and 15. The rotor 30 is driven to rotate by the engine of the vehicle via the pulley 36 that is fixed, by fastening, to the rotating shaft 31. The field coil 33 is wound on the radially outer side of a pair of boss portions 321 of the field core 32.

The field core 32 is a Lundell field core which is axially bisected to include a pair of pole cores 32a and 32b. Hereinafter, the pair of pole cores 32a and 32b will be respectively referred to as first pole core 32a and second pole core 32b. Each of the first and second pole cores 32a and 32b is formed of a soft-magnetic material by, for example, forging. The first and second pole cores 32a and 32b are identically shaped to each other. The first pole core 32a is fixed on one end side (i.e., the left side in FIG. 1) of the rotating shaft 31. The second pole core 32b is fixed on the other end side (i.e., the right side in FIG. 1) of the rotating shaft 31.

The first pole core 32a has a first boss portion 321a, a first disc portion 322a and a plurality of first claw-shaped magnetic pole portions 323a. The second pole core 32b has a second boss portion 321b, a second disc portion 322b and a plurality of second claw-shaped magnetic pole portions 323b. Each of the first boss portion 321a and the second boss portion 321b is cylindrical-shaped and has a shaft hole formed along its central axis. In the axial holes of the first boss portion 321a and the second boss portion 321b, there is fitted and fixed the rotating shaft 31. In the first boss portion 321a and the second boss portion 321b, field magnetic flux axially flows on the radially inner side of the field coil 33. In addition, the first boss portion 321a and the second boss portion 321b respectively constitute the pair of boss portions 321 of the field core 32 described above.

The first disc portion 322a extends radially outward from an axially outer end part (i.e., a left end part in FIG. 1) of the first boss portion 321a. The first disc portion 322a has an annular base part connected with the first boss portion 321a and a plurality of protruding parts that protrude from the base part radially outward and are arranged at predetermined intervals in the circumferential direction. The second disc portion 322b extends radially outward from an axially outer end part (i.e., a right end part in FIG. 1) of the second boss portion 321b. The second disc portion 322b has an annular base part connected with the second boss portion 321b and a plurality of protruding parts that protrude from the base part radially outward and are arranged at predetermined intervals in the circumferential direction. In the first disc portion 322a and the second disc portion 322b, the field magnetic flux radially flows. In addition, the first disc portion 322a and the second disc portion 322b respectively constitute a pair of disc portions 322 of the field core 32.

Each of the first claw-shaped magnetic pole portions 323a axially extends from a radially outer end part of the first disc portion 322a and is located radially outside the first boss portion 321a. More specifically, each of the first claw-shaped magnetic pole portions 323a axially extends from a radially outer end part of a corresponding one of the protruding parts of the first disc portion 322a. On the other hand, each of the second claw-shaped magnetic pole portions 323b axially extends from a radially outer end part of the second disc portion 322b and is located radially outside the second boss portion 321b. More specifically, each of the second claw-shaped magnetic pole portions 323b axially extends from a radially outer end part of a corresponding one of the protruding parts of the second disc portion 322b. Moreover, the first claw-shaped magnetic pole portions 323a and the second claw-shaped magnetic pole portions 323b are arranged to axially extend on the radially outer side of the field coil 33. The first claw-shaped magnetic pole portions 323a and the second claw-shaped magnetic pole portions 323b are capable of exchanging magnetic flux with the stator core 21. Each of the first claw-shaped magnetic pole portions 323a and the second claw-shaped magnetic pole portions 323b constitutes one claw-shaped magnetic pole portion 323 of the field core 32.

Figure 2:
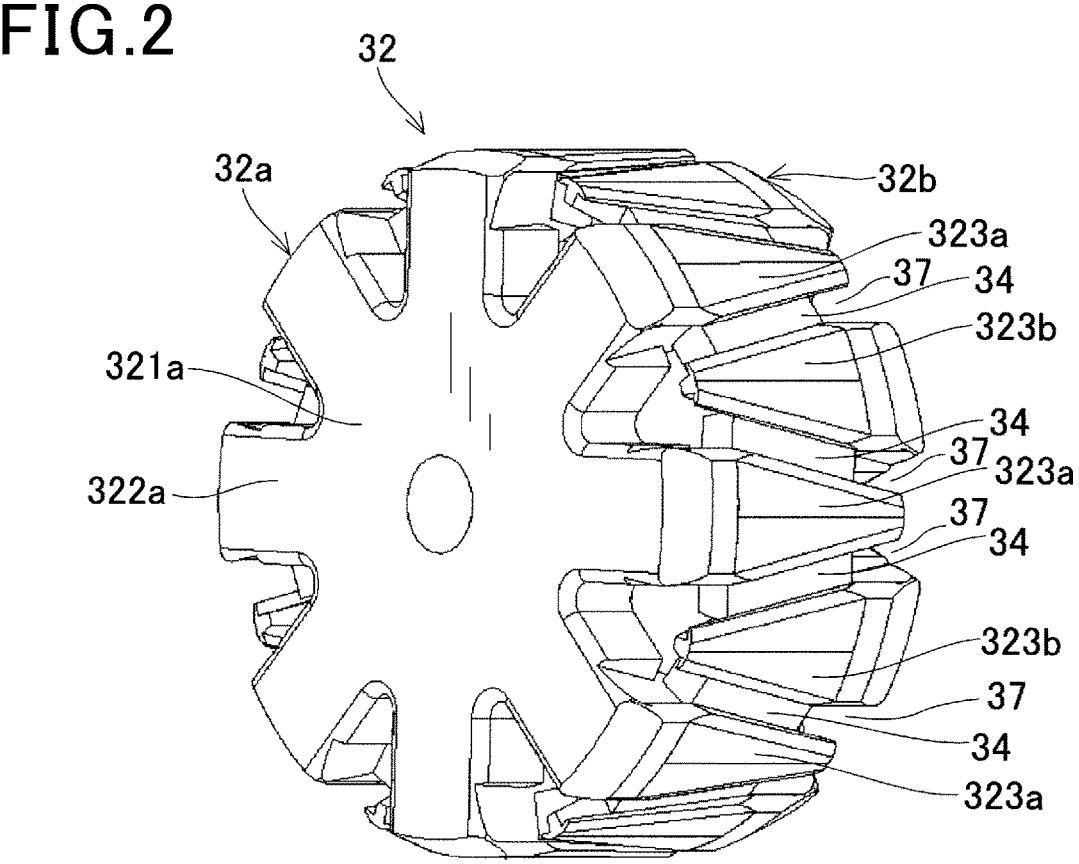
FIG. 2 is a perspective view of a rotor of the rotating electric machine according to the embodiment.
Figure 3:
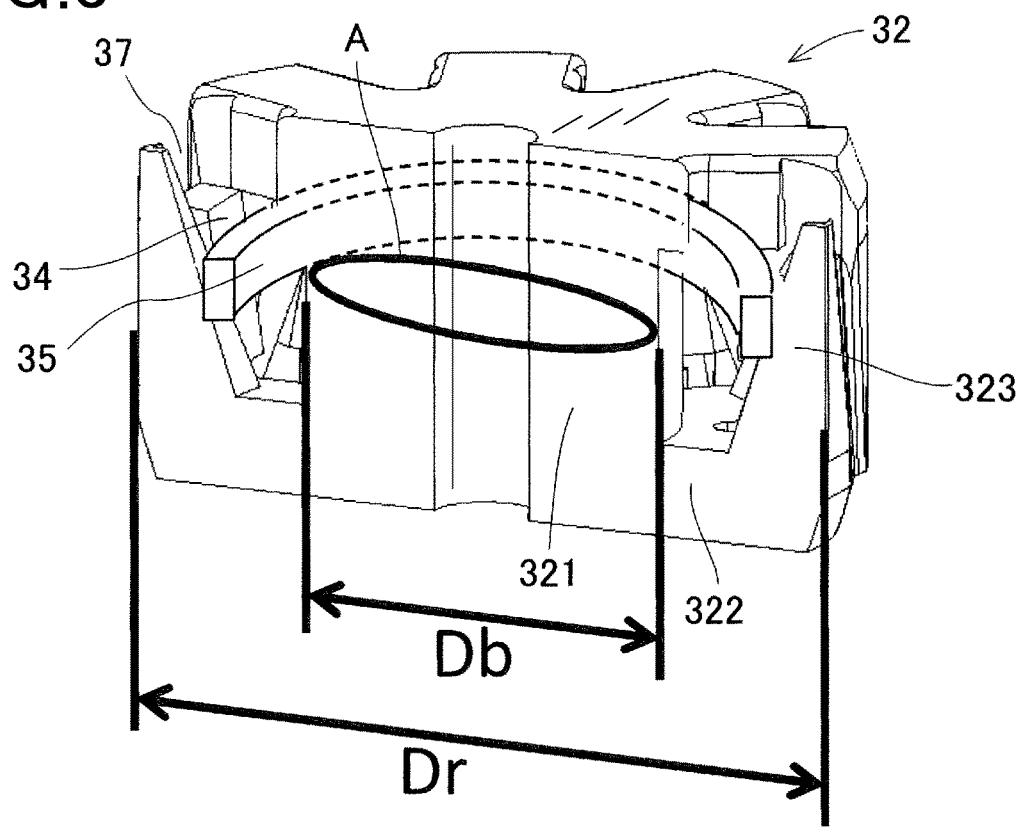
FIG. 3 is a perspective view of half of the rotor of the rotating electric machine according to the embodiment illustrating various dimensions of the rotor.

The number of the first claw-shaped magnetic pole portions 323a and the number of the second claw-shaped magnetic pole portions 323b are set to the same number (e.g., eight). As shown in FIGS. 1-3, the first and second pole cores 32a and 32b are assembled together so that: axial end surfaces of the first and second boss portions 321a and 321b abut each other; and the first claw-shaped magnetic pole portions 323a are arranged alternately with the second claw-shaped magnetic pole portions 323b in the circumferential direction. Moreover, proximal end parts (or root parts) of the first claw-shaped magnetic pole portions 323a which are connected with the first disc portion 322a and proximal end parts (or root parts) of the second claw-shaped magnetic pole portions 323b which are connected with the second disc portion 322b are arranged alternately on opposite axial sides. More specifically, the first claw-shaped magnetic pole portions 323a protrude from the first disc portion 322a to a first axial side (i.e., the right side in FIG. 1) while the second claw-shaped magnetic pole portions 323b protrude from the second disc portion 322b to a second axial side (i.e., the left side in FIG. 1). Furthermore, as shown in FIG. 2, between each circumferentially-adjacent pair of the first and second claw-shaped magnetic pole portions 323a and 323b, there is formed a gap 37. The polarity (e.g., N) of magnetic poles formed by the first claw-shaped magnetic pole portions 323a and the polarity (e.g., S) of magnetic poles formed by the second claw-shaped magnetic pole portions 323b are different from (or opposite to) each other.

Each of the first and second claw-shaped magnetic pole portions 323a and 323b is formed to have a predetermined width in the circumferential direction (i.e., circumferential width) and a predetermined thickness in the radial direction (i.e., radial thickness). Moreover, each of the first and second claw-shaped magnetic pole portions 323a and 323b is formed so that both the circumferential width and radial thickness of the claw-shaped magnetic pole portion gradually decrease from the proximal end part of the claw-shaped magnetic pole portion in the vicinity of the disc portion 322a or 322b to the distal end part of the claw-shaped magnetic pole portion. In other words, each of the first and second claw-shaped magnetic pole portions 323a and 323b is formed so as to become thinner in both the circumferential and radial directions from the proximal end part thereof to the distal end part thereof In addition, it is preferable that each of the first and second claw-shaped magnetic pole portions 323a and 323b is formed symmetrically with respect to a circumferential center thereof.

Hereinafter, as shown in FIG. 3, the outer diameter of the boss portions 321 of the field core 32 will be referred to as boss portion outer diameter Db and the outer diameter of the rotor 30 (i.e., the claw-shaped magnetic pole portions 323) will be referred to as rotor outer diameter Dr. The boss portion outer diameter Db and the rotor outer diameter Dr are set to satisfy the relationship of the following formula (1):

$$0.46 < Db/Dr < 0.53 \quad (1)$$

Figure 4:
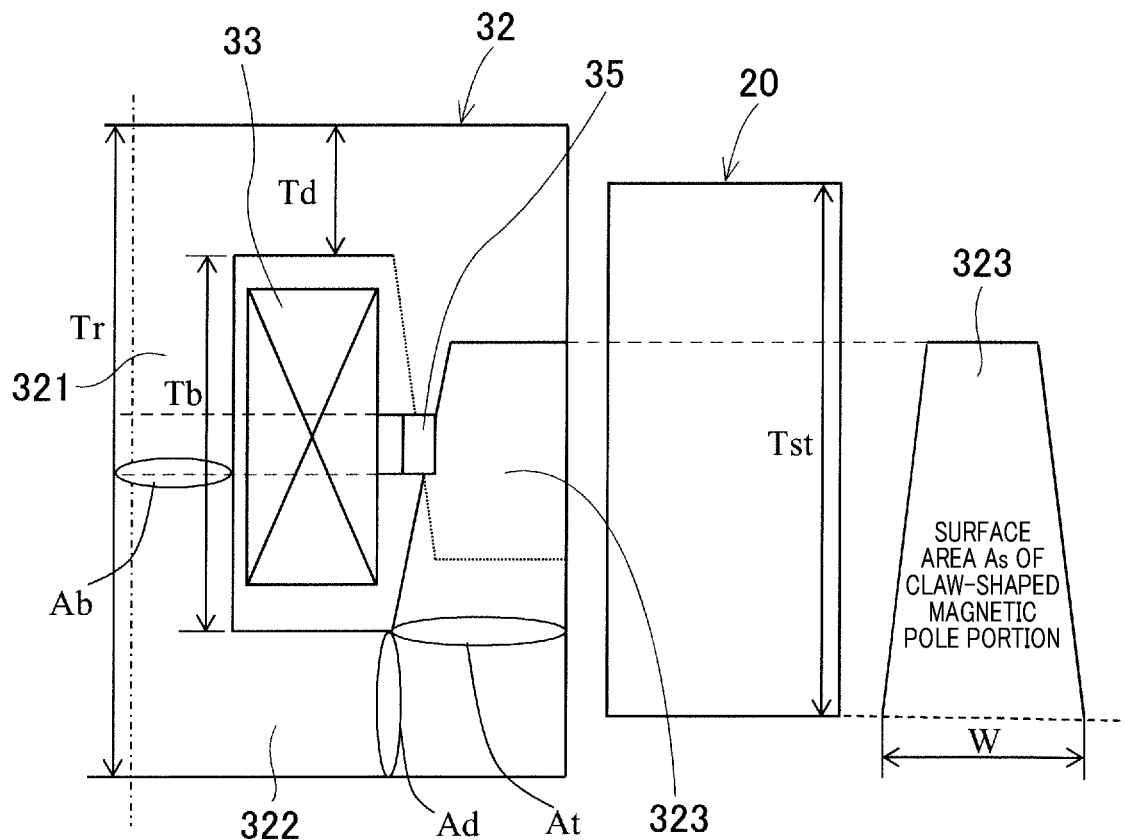
FIG. 4 is a schematic view illustrating various dimensions of the rotor and a stator of the rotating electric machine according to the embodiment.

Moreover, as shown in FIG. 4, the surface area (i.e., the area of the surface facing radially outward) of each claw-shaped magnetic pole portion 323 will be referred to as claw-shaped magnetic pole portion surface area As [mm²], the magnetic path cross-sectional area of the boss portions 321 per pair of N and S magnetic poles (i.e., the area of a cross section, perpendicular to the axial direction, of a part of axially-extending boss portions 321 which corresponds to one pair of N and S magnetic poles) will be referred to as boss portion cross-sectional area Ab [mm²], and the magnetic path cross-sectional area of the disc portions 322 per claw-shaped magnetic pole portion 323 (i.e., the area of a cross-section, perpendicular to the extending direction, of each protruding part of the radially-extending disc portions 322) will be referred to as disc portion cross-sectional area Ad [mm²]. The claw-shaped magnetic pole portion surface area As and the boss portion cross-sectional area Ab are set to satisfy the relationship of the following formula (2). Moreover, the claw-shaped magnetic pole portion surface area As and the disc portion cross-sectional area Ad are set to satisfy the relationship of the following formula (3). In addition, the boss portion cross-sectional area Ab can be expressed as A/P, where A is the total cross-sectional area of the boss portions 321 and P is the pole pair number of the rotating electric machine 1.

$$0.9 < As/Ab < 1.7 \quad (2)$$

$$0.9 < As/Ad < 1.7 \quad (3)$$

Figure 6:
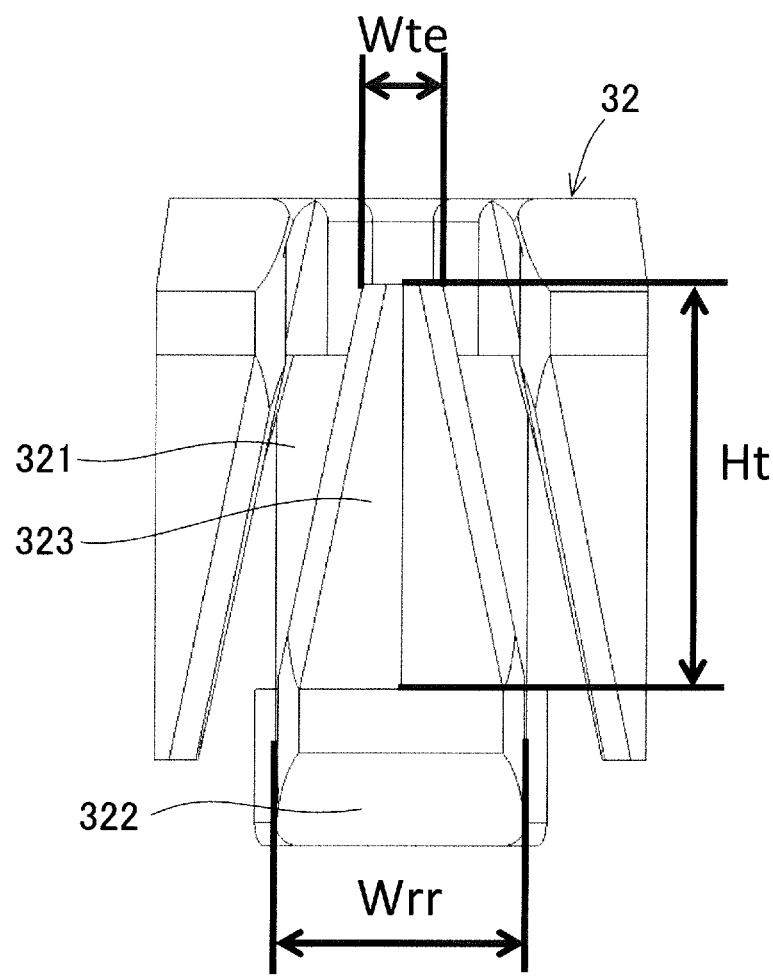
FIG. 6 is a schematic side view illustrating various dimensions of claw-shaped magnetic pole portions of the rotor of the rotating electric machine according to the embodiment.
Figure 7:
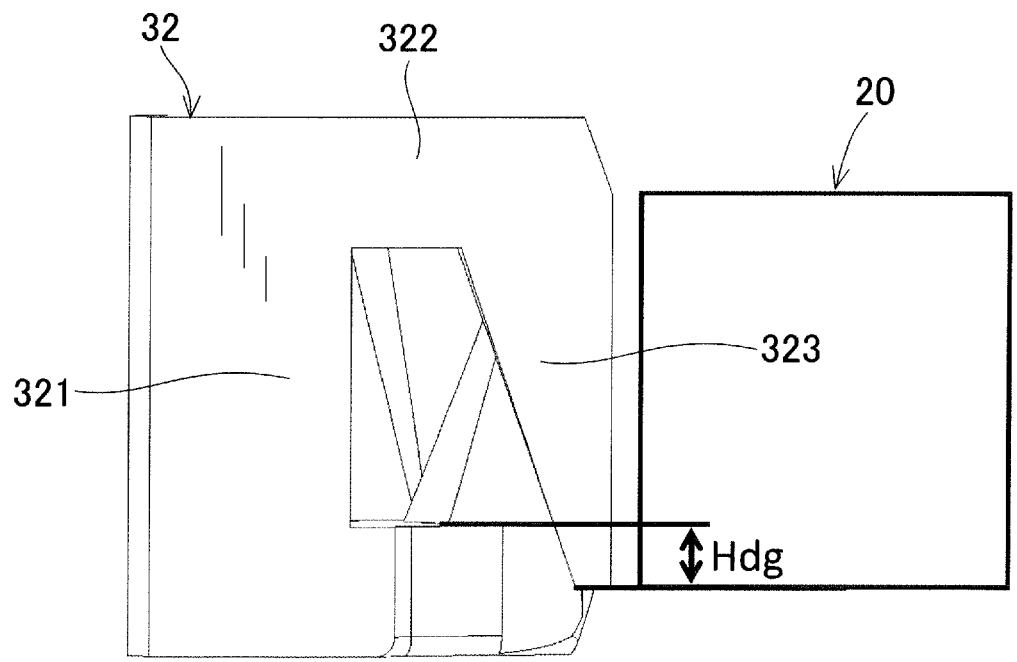
FIG. 7 is a schematic view illustrating various dimensions of the rotor and the stator of the rotating electric machine according to the embodiment.
Figure 8:
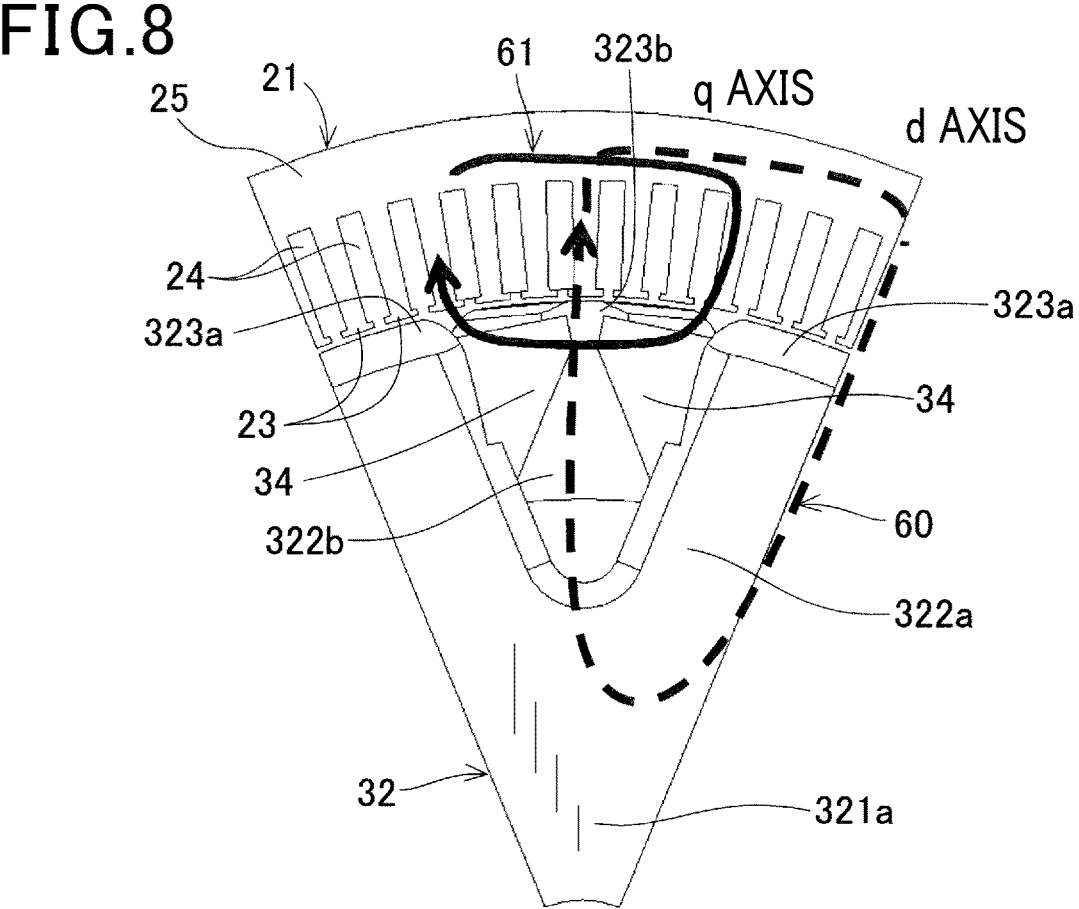
FIG. 8 is a schematic view illustrating a d-axis magnetic circuit and a q-axis magnetic circuit formed in the rotating electric machine according to the embodiment.

Here, the claw-shaped magnetic pole portion surface area As is defined in more detail. As shown in FIGS. 6 and 7, the circumferential width of each claw-shaped magnetic pole portion 323 at its proximal end (or root) (i.e., the circumferential width of each protruding part of the disc portions 322) will be referred to as circumferential width Wrr, the circumferential width of each claw-shaped magnetic pole portion 323 at its distal end will be referred to as circumferential width Wte, and the axial height of each claw-shaped magnetic pole portion 323 will be referred to as axial height Ht. Moreover, the axial range where each disc portion 322 radially overlaps the stator core 21 (i.e., the axial length of that part of each disc portion 322 which radially faces the stator core 21) will be referred to as disc guide Hdg. In addition, no big difference occurs with cuts, R portions or chamfered portions provided in the disc portions 322, the claw-shaped magnetic pole portions 323 or the stator core 21 for the sake of magnet insertion or strength reinforcement. The claw-shaped magnetic pole portion surface area As can be expressed by the following formula (4). In addition, in the present embodiment, the circumferential widths Wrr and Wte are measured as straight-line distances without considering curvatures.

$$As = (Wte + Wrr) \times Ht/2 + Hdg \times Wrr \quad (4)$$

As described above, each of the gaps 37 is formed between one circumferentially-adjacent pair of the first and second claw-shaped magnetic pole portion 323a and 323b. Moreover, each of the gaps 37 extends obliquely with respect to the axial direction (i.e., are oblique at a predetermined angle to the rotating shaft 31 of the rotor 30). Furthermore, each of the gaps 37 is formed so that its circumferential dimension (i.e., circumferential size) hardly changes with the axial position, in other words, its circumferential dimension is kept at a constant value or within a very narrow range which includes the constant value. In each of the gaps 37, there is arranged one of the permanent magnets 34.

The field core 32 is formed of two types of materials having different saturation flux densities. The claw-shaped magnetic pole portions 323 of the field core 32 are formed of a first material. The other portions of the field core 32 than the claw-shaped magnetic pole portions 323, i.e., the boss portions 321 and the disc portions 322 are formed of a second material that is lower in saturation flux density than the first material.

As the first material, materials whose carbon content is about 0.1%, such as S10C according to JIS, may be employed. On the other hand, as the second material, materials whose carbon content is relatively high, such as S45C according to JIS, may be employed. In addition, SUS430 according to JIS or magnetic steel sheets, which are lower in saturation flux density than S10C, may also be employed as the second material. Moreover, the second material is higher in magnetic permeability than the first material. In addition, materials which have high magnetic permeability may include, for example, Permalloy and iron having nickel and/or cobalt added thereto. Permalloy is most suitable as the second material.

The field coil 33 is wound, on the radially outer side of the boss portions 321a and 321b of the pair of pole cores 32a and 32b, in a state of being insulated from the field core 32. The field coil 33 is arranged in both the radial gap formed between the first boss portion 321a and the first claw-shaped magnetic pole portions 323a of the first pole core 32a and the radial gap formed between the second boss portion 321b and the second claw-shaped magnetic pole portions 323b of the second pole core 32b. Upon being supplied with the field current that is direct current, the field coil 33 generates magnetomotive force in the boss portions 321a and 321b. Magnetic flux generated by the field coil 33 is guided from the boss portions 321a and 321b to the claw-shaped magnetic pole portions 323a and 323b via the disc portions 322a and 322b. The field coil 33 magnetizes, with the generated magnetic flux, the first claw-shaped magnetic pole portions 323a into N poles and the second claw-shaped magnetic pole portions 323b into S poles.

Magnetic flux, which flows through the boss portions 321a and 321b, the disc portions 322a and 322b and one pair of the first and second claw-shaped magnetic pole portions 323a and 323b of the field core (i.e., the pair of pole cores 32a and 32b), forms a d-axis magnetic circuit 60. As shown with dashed lines in FIGS. 8 and 9, the d-axis magnetic circuit 60 is a magnetic circuit along which the magnetic flux: 1) enters the first claw-shaped magnetic pole portion 323a of the field core 32 from a first tooth 23 of the stator core 21 through which the d axis extends; 2) flows, via the first disc portion 322a→the first boss portion 321a→the second boss portion 321b→the second disc portion 322b→the second claw-shaped magnetic pole portion 323b, to a second tooth 23 of the stator core 21 which is located apart from the first tooth 23 by one magnetic pole; and 3) returns to the first tooth 23 via the back core 25. The d-axis magnetic circuit 60 is a magnetic circuit for generating counterelectromotive force of the rotor 30.

Moreover, a q-axis magnetic circuit 61 is formed upon electric current flowing in the stator coil 22 due to magnetic fluxes that flow through the d-axis magnetic circuit 60 and a first magnet magnetic circuit 62 to be described later, crossing the stator coil 20. As shown with a solid line in FIG. 8, the q-axis magnetic circuit 61 is a magnetic circuit which is formed by magnetic flux flowing through the q axis of the stator core 21; the q axis is located at a position offset from the d axis by 90° in electrical angle. The permeance Prt of the d-axis magnetic circuit 60 and the permeance Pst of the q-axis magnetic circuit 61 are set to satisfy the following formula (5) when the rotor 30 is loaded. In addition, the permeance Prt and the permeance Pst are respectively the reciprocals of magnetic reluctances of the d-axis magnetic circuit 60 and the q-axis magnetic circuit 61.

$$Pst > Prt \quad (5)$$

Here, the expression "when the rotor 30 is loaded" denotes a state of the rotor 30 where the field current If, which is supplied as rated current to the field coil 33, is in the range of 4 A-20 A; this range is a general range in consideration of the vehicular brush capability. In addition, the field current If might be set to 30 A with future improvements in the brush capability. Otherwise, with a brushless configuration having no limitation on the field current If, it is possible to set the field current If to be higher than the above range. In any cases, it is required to satisfy the relationship of Pst>Prt. Moreover, in terms of satisfying the relationship of Pst>Prt with nowadays brushes, the effects of setting the boss portion outer diameter Db and the rotor outer diameter Dr to satisfy the above formula (1) and setting the claw-shaped magnetic pole portion surface area As, the boss portion cross-sectional area Ab and the disc portion cross-sectional area Ad to satisfy the above formula (2) or formula (3) are significant.

Moreover, the permeance Prt of the d-axis magnetic circuit 60 and the permeance Pst of the q-axis magnetic circuit 61 are set to satisfy the relationship of the following formula (6), where n is a real number greater than or equal to 1.

$$Pst:Prt = 2n:1 \quad (6)$$

Figure 10:
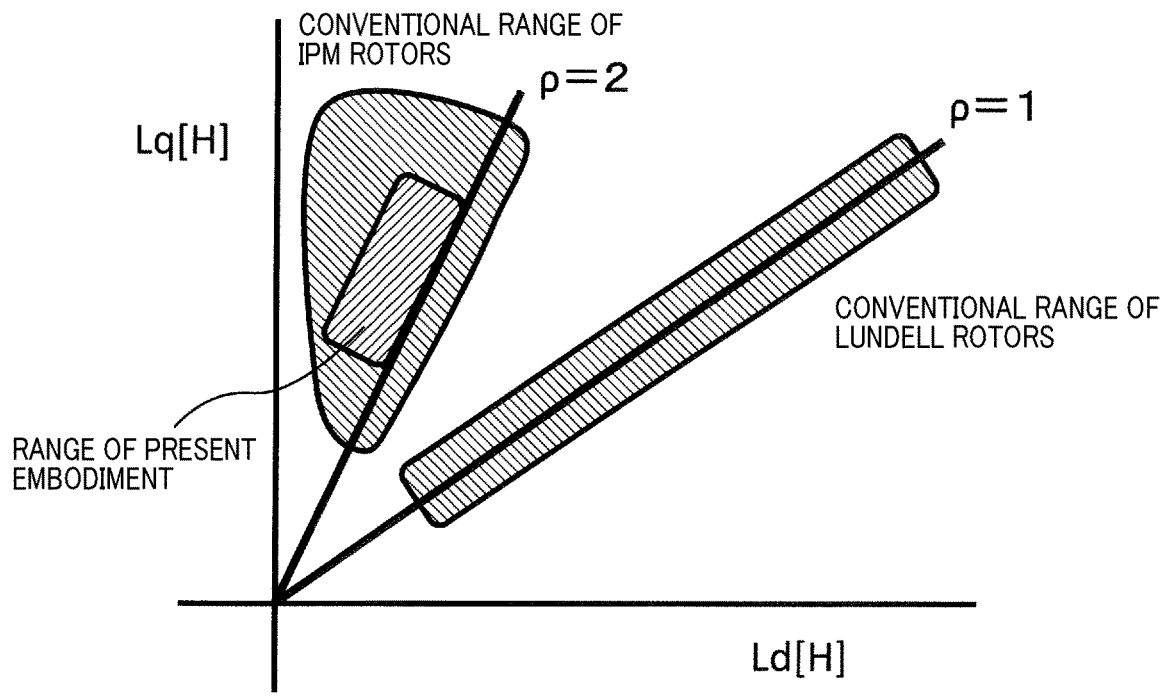
FIG. 10 is a graph giving a comparison between a salient pole ratio of the rotor of the rotating electric machine according to the embodiment and salient pole ratios p of conventional Lundell rotors and IPM rotors.
Figure 11:
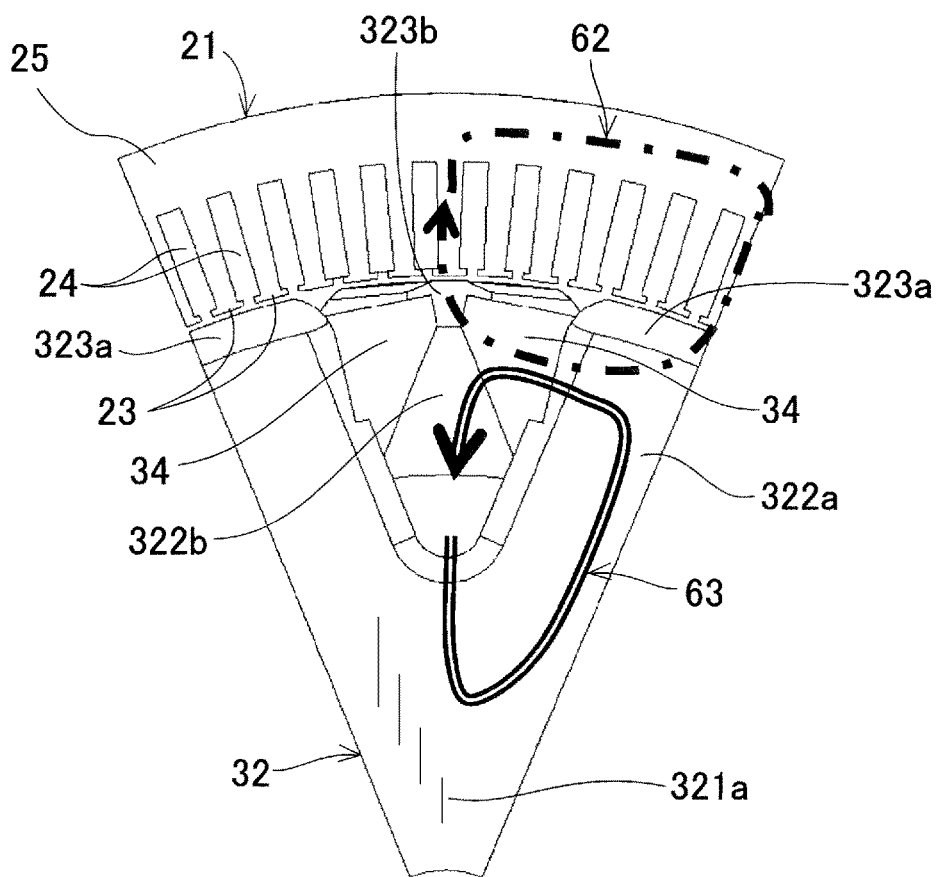
FIG. 11 is a schematic view illustrating two magnet magnetic circuits formed by each permanent magnet in the rotating electric machine according to the embodiment.

Here, the ratio Lq/Ld between the q-axis inductance Lq and the d-axis inductance Ld is defined as salient pole ratio ρ. As shown in FIG. 10, the salient pole ratio ρ is approximately 1 (ρ≈1) in Lundell rotors according to the prior art. The salient pole ratio ρ is approximately 2 to 4 (i.e., ρ≈2-4) in IPM rotors according to the prior art. In the present embodiment, by setting the permeance Prt of the d-axis magnetic circuit 60 and the permeance Pst of the q-axis magnetic circuit 61 to satisfy the relationship of the above formula (6), it becomes possible to make the mode of the Lundell rotor approach the mode of an IPM rotor; thus it becomes possible to make the salient pole ratio ρ greater than or equal to 2 when the rotor 30 is loaded.

Figure 9:
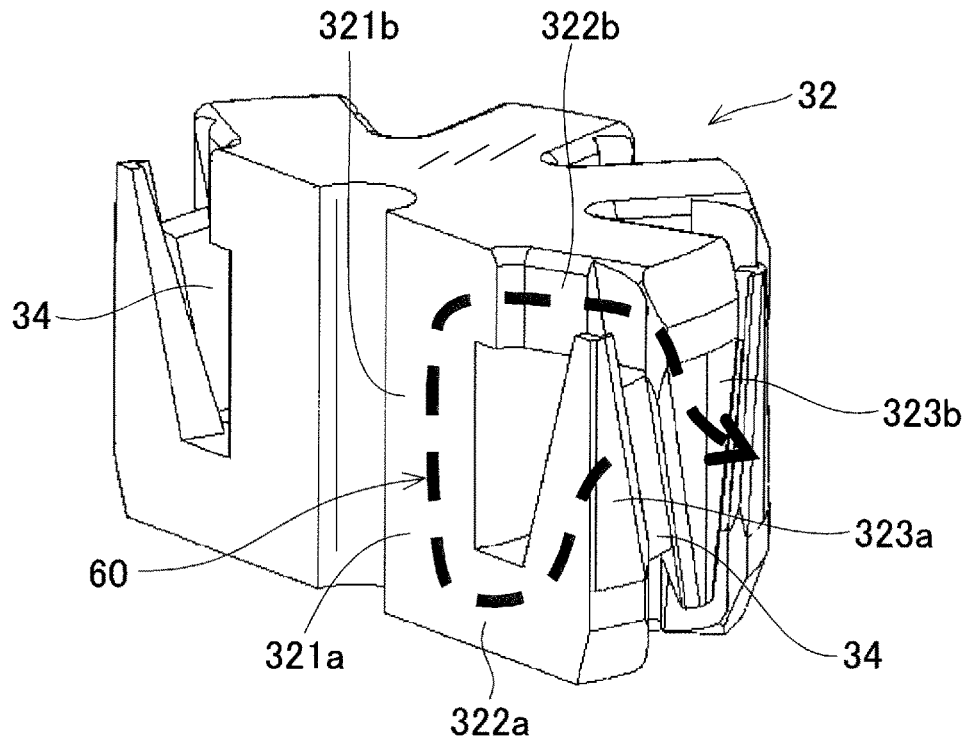
FIG. 9 is a schematic view illustrating flow of magnetic flux in a field core-side part of the d-axis magnetic circuit formed in the rotating electric machine according to the embodiment.

As shown in FIGS. 2, 3 and 9, in each of the gaps 37 formed between the circumferentially adjacent first and second claw-shaped magnetic pole portions 323a and 323b, there is arranged one of the permanent magnets 34. That is, the number of the permanent magnets 34 is equal to the number of the gaps 37. Each of the permanent magnets 34 is formed in a substantially cuboid shape. Moreover, each of the permanent magnets 34 extends obliquely with respect to the axial direction (i.e., is oblique at a predetermined angle to the rotating shaft 31 of the rotor 30).

The permanent magnets 34 are provided to form magnetic poles that are oriented to reduce leakage magnetic flux between the claw-shaped magnetic pole portions 323a and 323b. Specifically, each of the permanent magnets 34 is arranged to have its axis of easy magnetization oriented in the circumferential direction (more precisely, in a direction inclined with respect to the circumferential direction by the predetermined angle at which the permanent magnets 34 are oblique with respect to the rotating shaft 31). Each of the permanent magnets 34 is held to have its magnetic pole portions respectively on the two circumferential sides facing or abutting circumferential side surfaces of one pair of the first and second claw-shaped magnetic pole portions 323a and 323b. In each of the permanent magnets 34, magnetic poles are formed so as to match the polarities induced in the pair of the first and second claw-shaped magnetic pole portions 323a and 323b due to the magnetomotive force of the field coil 33. That is, each of the permanent magnets 34 is configured to have its N pole formed at a circumferential side surface thereof facing the first claw-shaped magnetic pole portion 323a to be magnetized into an N pole and its S pole formed at a circumferential side surface thereof facing the second claw-shaped magnetic pole portion 323b to be magnetized into an S pole.

With the permanent magnets 34 provided as described above, two magnet magnetic circuits 62 and 63 are formed for each of the permanent magnets 34. As shown with a one-dot chain line in FIG. 11, the first magnet magnetic circuit 62 is a magnetic circuit along which magnet magnetic flux flows to cross the stator 20. On the other hand, as shown with a double line in FIG. 11, the second magnet magnetic circuit 63 is a magnetic circuit along which magnet magnetic flux flows to circulate within the rotor 30 through the boss portions 321a and 321b and the disc portions 322a and 322b. Of the two magnet magnetic circuits, the second magnet magnetic circuit 63, which extends through the boss portions 321a and 321b, is a magnetic circuit along which the magnet magnetic flux unavailable for the stator 20 flows. In contrast, the first magnet magnetic circuit 62 is a magnetic circuit along which the magnet magnetic flux flows to cross the stator 20 and thereby generate counterelectromotive force or torque.

The first magnet magnetic circuit 62 and the d-axis magnetic circuit 60 are at least partially coincident with each other to share a common circuit portion. Specifically, a magnetic circuit portion from the second claw-shaped magnetic pole portion 323b to the first claw-shaped magnetic pole portion 323a via the stator 20 is common to the first magnet magnetic circuit 62 and the d-axis magnetic circuit 60. Moreover, the second magnet magnetic circuit 63 and the d-axis magnetic circuit 60 are also at least partially coincident with each other to share a common circuit portion. Specifically, a magnetic circuit portion formed in the boss portions 321a and 321b and the disc portions 322a and 322b of the pair of pole cores 32a and 32b are common to the second magnet magnetic circuit 63 and the d-axis magnetic circuit 60.

In addition, the magnetic path cross-sectional area of the boss portions 321a and 321b per pair of N and S magnetic poles will be referred to as boss portion cross-sectional area Ab. The magnetic flux density when magnetic field of 5000 A/m is applied to the boss portions 321a and 321b will be referred to as magnetic flux density B50 [T]. The residual magnetic flux density of the permanent magnets 34 arranged between the claw-shaped magnetic pole portions 323a and 323b will be referred to be residual magnetic flux density Br [T]. The magnetic path cross-sectional area of each magnetic pole portion (i.e., the area of each of the surfaces constituting the magnetic poles) of the permanent magnets 34 will be referred to as permanent magnet cross-sectional area Am [mm$^2$]. The boss portion cross-sectional area Ab, the magnetic flux density B50, the residual magnetic flux density Br and the permanent magnet cross-sectional area Am are set to satisfy the relationship of the following formula (7).

$$2 \times Br \times Am < B50 \times Ab \qquad (7)$$

Figure 5:
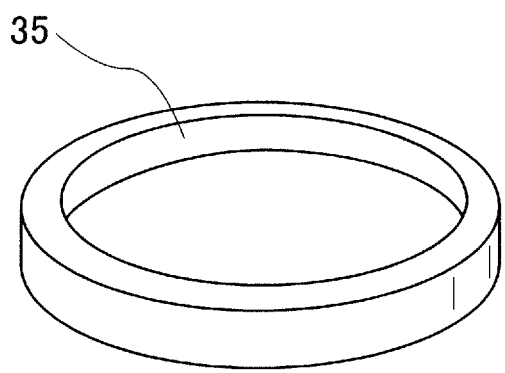
FIG. 5 is a perspective view of a fixing member included in the rotor of the rotating electric machine according to the embodiment.

As shown in FIGS. 3-5, in the rotor 30, the ring member 35 is a member which is formed in a ring shape and fixed to all the claw-shaped magnetic pole portions 323 of the field core 32. Specifically, the ring member 35 is fixed to radially inner parts of the claw-shaped magnetic pole portions 323 which face the boss portions 321 (i.e., parts of the claw-shaped magnetic pole portions 323 on the radially opposite side to the stator 20). In addition, for the sake of convenience, the ring member 35 is not shown in FIG. 1.

The fixing of the ring member 35 to the claw-shaped magnetic pole portions 323 may be realized by, for example, welding or brazing. Moreover, each of the claw-shaped magnetic pole portions 323 is formed to have its radial thickness gradually decreasing from its proximal end part in the vicinity of the corresponding disc portion 322 to its distal end part. Therefore, the ring member 35 may be fixed to the claw-shaped magnetic pole portions 323 at an axial position where the inner diameter of the first claw-shaped magnetic pole portions 323a is equal to the inner diameter of the second claw-shaped magnetic pole portions 323b (e.g., at the axial centers of the first and second claw-shaped magnetic pole portions 323a and 323b). In this case, as shown in FIG. 5, the ring member 35 is formed in an annular shape such that fixing portions of the ring member 35 which are respectively fixed to the first claw-shaped magnetic pole portions 323a have the same outer diameter as fixing portions of the ring member 35 which are respectively fixed to the second claw-shaped magnetic pole portions 323b, i.e., the outer diameters of the fixing portions of the ring member 35, which are respectively fixed to the claw-shaped magnetic pole portions 323, are constant over the entire circumferential range of the ring member 35.

In addition, instead of fixing the ring member 35 to the claw-shaped magnetic pole portions 323 at the axial position where the inner diameter of the first claw-shaped magnetic pole portions 323a is equal to the inner diameter of the second claw-shaped magnetic pole portions 323b, the ring member 35 may be fixed to the claw-shaped magnetic pole portions 323 at a position offset to either of axial sides from the axial position where the inner diameters of the first and second claw-shaped magnetic pole portions 323a and 323b are equal to each other. In this case, the ring member 35 would be formed in an annular shape such that the outer diameter of the ring member 35 periodically changes in the circumferential direction so as to conform to the inner diameters of the first and second claw-shaped magnetic pole portions 323a and 323b.

The ring member 35 is formed of a nonmagnetic material (e.g., austenitic stainless steel or brass). The ring member 35 supports all the claw-shaped magnetic steel portions 323 of the field core 32 from the radially inner side. The ring member 35 has a function of suppressing deformation in which the claw-shaped magnetic pole portions 323 of the field core 32 are moved radially outward due to the centrifugal force generated during rotation of the rotor 30.

The field coil energization device 40 is a device for energizing the field coil 33. As shown in FIG. 1, the field coil energization device 40 includes a pair of slip rings 41, a pair of brushes 42 and a regulator 43. The slip rings 41 are fitted and fixed on one axial end portion (i.e., the right end portion in FIG. 1) of the rotating shaft 31. The slip rings 41 have a function of supplying direct current to the field coil 33 of the rotor 30. The brushes 42 are held by a brush holder mounted and fixed to the housing 10.

Each of the brushes 42 is arranged so that its radially inner end part slides, in a state of being pressed to the rotating shaft 31 side, on the surface of a corresponding one of the slip rings 41. The brushes 42 perform such energization as to supply direct current to the field coil 33 via the slip rings 41. The regulator 43 regulates an output voltage of the rotating electric machine 1 by controlling the field current If supplied to the field coil 33.

The rectifier 50 is electrically connected with the stator coil 22 of the stator 20. The rectifier 50 rectifies alternating current generated in the stator coil 22 into direct current and outputs the direct current. The rectifier 50 is configured with a plurality of diodes (i.e., rectifying elements).

In the rotating electric machine 1 having the above-described configuration, upon supply of torque from the engine of the vehicle to the pulley 36 via a belt, the rotor 30 rotates along with the rotating shaft 31 in a predetermined direction. During rotation of the rotor 30, a field voltage is applied from the brushes 42 of the field coil energization device 40 to the field coil 33 of the rotor 30 via the slip rings 41. Upon application of the field voltage, the claw-shaped magnetic pole portions 323a and 323b of the pole cores 32a and 32b are magnetized to form N and S magnetic poles alternately in the circumferential direction of the rotor 30.

Upon formation of the N and S magnetic poles at the claw-shaped magnetic pole portions 323a and 323b, a rotating magnetic field is applied to the stator coil 22 of the stator 20, causing AC electromotive force to be generated in the stator coil 22. The AC electromotive force generated in the stator coil 22 is rectified by the rectifier 50 into a DC voltage; then the DC voltage is outputted from an output terminal to the battery. Consequently, it is possible to cause the rotating electric machine 1 to function as an electric generator that charges the battery with the electromotive force generation in the stator coil 22.

(Regarding Setting of Relationship of 2×Br [T]×Am [mm$^2$]<B50 [T]×Ab [mm$^2$])

The rotating electric machine 1 is designed as a vehicular motor-generator to be connected to an electric power source of 12V-48V (in addition, 6V-60V in the case of including tolerances) and replaceable with an alternator and a starter. Therefore, it is impossible to set the counterelectromotive force to be high as in IPM rotors. Generally, a counterelectromotive force of 200V-300V is generated in IPM rotors where the rotor outer diameter is about 70 mm-120 mm and the rotor axial length is about 30 mm-80 mm. However, with this configuration, it is impossible to sufficiently lower the counterelectromotive force due to the concerns about overcharge of the battery of 12V-48V or the influence of a high voltage on other electrical parts even when overcharge is reduced.

Therefore, to solve the above problem, the rotor 30 is designed to satisfy the relationship of 2×Br [T]×Am [mm$^2$] <Bs [T]×Ab [mm$^2$]. Designing the rotor 30 as above, the allowable amount of magnetic flux (Bs×Ab) is made larger than the amount of magnetic flux (2×Br×Am) generated by each permanent magnet 34; consequently, it is possible to absorb, by the boss portions 321, substantially all the amount of magnetic flux generated by each permanent magnet 34. Bs [T] is the saturation magnetic flux density of the field core 32. Here, unless the relative permeability is sufficiently high, it is impossible to sufficiently absorb the residual magnetic flux density Br [T]. In addition, though the saturation magnetic flux density Bs [T] of the field core 32 is employed, investigation is made herein with the value of B50 [T] that is commonly used.

In general, the magnetomotive force applied to the field core 32 is lower than or equal to 2500 AT in products of 12V-48V. That is, to allow the strength of a demagnetizing field applied to the permanent magnets 34 to be equal to 2500 AT, it is necessary for the resistance to the demagnetizing field to be about twice this value. In other words, it is preferable for the thickness and magnetic coercive force Hc of the permanent magnets 34 to be designed with a safety factor so as to be about 5000 A or higher. The residual magnetic flux density Br and the magnetic coercive force Hc slightly change according the temperature at which the rotor 30 is used; therefore, it is necessary for them to be designed to be about 5000 A in a temperature range of −40° C. to +160° C. within which the rotor 30 is expected to be used. In the design example of the present embodiment, the permanent magnets 34 are designed at about 5000 A and the boss portions 321 are specified with the value of B50 which is the magnetic flux density at 5000 AT; therefore, it is possible to satisfy the relationship of 2×Br [T]×Am [mm$^2$] <Bs [T]×Ab [mm$^2$]. Moreover, the relative permeability of the boss portions 321 when the field current is weakened is higher than or equal 30, and thus sufficiently high.

(Regarding Relationship between Claw-shaped Magnetic Pole Portion Surface Area As and Boss Portion Cross-sectional Area Ab, and Relationship between Boss Portion Outer Diameter Db and Rotor Outer Diameter Dr)

Next, the range within which magnet magnetic flux can be effectively used is investigated. In specifying the correlation formula in a rotating electric machine according to the prior art (see, for example, Japanese Patent Application Publication No. JPH04255451A), the conditions are incomplete; therefore, the correlation formula may not be satisfied when, for example, the size of the boss portions 321 of the field core 32 is changed. Accordingly, the following investigation is made for the entire rotor.

In the claw pole rotating electric machine, magnetic flux is generated at locations (more specifically, the boss portions) different from those at which the stator and the rotor face each other; the axial length of the stator can be fully utilized by having the magnetic flux flow in the axial direction. Moreover, in the claw pole rotating electric machine, as shown in FIG. 4, the magnetic flux is outputted with the boss portion cross-sectional are Ab, the disc portion cross-sectional are Ad and the cross-sectional area At of each claw-shaped magnetic pole portion 323 at its proximal end (or root) (hereinafter, to be referred to as claw-shaped magnetic pole portion cross-sectional area) kept substantially constant. In addition, in the case where stepped portions are formed from the boss portions 321 to the corresponding disc portions 322 and thus the cross-sectional area is partially reduced, the reduced cross-sectional area will be employed as the boss portion cross-sectional area Ab or the disc portion cross-sectional area Ad. By forming the stepped portions, it is possible to change the allowable amount of magnetic flux. Moreover, each claw-shaped magnetic pole portion 323 has a suitable area of the facing surface for allowing the field magnetic flux, which is generated in the boss portions 321 upon energization of the field coil 33 (not shown in FIG. 4) wound on the radially outer side of the boss portions 321, to flow therethrough; the facing surface faces the stator 20. That is, each claw-shaped magnetic pole portion 323 has a suitable area of the facing surface in proportion to the boss portion cross-sectional area Ab.

As shown in FIG. 4, in the case of each disc portion 322 radially facing the stator 20, i.e., in the case of each disc portion 322 partially overlapping the stator 20 in the radial direction, it is possible to reduce the claw-shaped magnetic pole portion surface area As to be smaller than the boss portion cross-sectional area Ab by an amount corresponding to the surface area of the overlapping portion of each disc portion 322. That is, ideal values can be calculated to satisfy: Ab≈Ad≈As; or As≈Ab−(Tst−Tb)/2×W. Here, in the rotor which has the permanent magnets 34 mounted therein, there should be another solution since the number of magnetic force sources is increased.

In the rotor 30 which has the permanent magnets 34 and the field circuit provided therein, the magnet magnetic flux is distributed to two directions, i.e., the route (i.e., the second magnet magnetic circuit 63 shown in FIG. 11) along which the magnet magnetic flux flows in the rotor 30 against the field magnetic flux (i.e., the magnetic flux flowing along the d-axis magnetic circuit 60) and the route (i.e., the first magnet magnetic circuit 62 shown in FIG. 11) along which the magnet magnetic flux flows through the stator 20. Therefore, it should be possible to reduce the boss portion cross-sectional area Ab, the disc portion cross-sectional area Ad and the claw-shaped magnetic pole portion cross-sectional area At, all of which are shown in FIG. 4, to be smaller than those according to the prior art. Meanwhile, considering the electromotive force, it is necessary to satisfy the relationship of 2×Br×Am<B50×Ab. Moreover, since the boss portion outer diameter Db is reduced, the arrangement space of the field coil 33 should be increased and thus the amount of the generated heat should be reduced.

Here, upon the rotor outer diameter Dr being determined, the ratio between the rotor outer diameter Dr and the boss portion outer diameter Db should be uniquely determined since the ratio between the width W of the claw-shaped magnetic pole portions 323 and the width of the boss portions 321 per pole hardly changes even with change in the number of poles. The boss portion outer diameter Db can be calculated based on the flowing-back magnet magnetic flux and the field magnetic flux. It goes without saying that to suppress the heat generation, the resistance of the field coil 33 is set to be 0.1Ω–1.0Ω for motors and 1.0Ω–3.0Ω for electric generators taking into account the present air-cooling capability. In addition, Ab_opt represents the ideal value of the boss portion cross-sectional area Ab.

$$B50 \times Ab - 2 \times Br \times Am \times (Prt/(Pst+Prt)) = Ab\_opt$$

Moreover, at the time point of the present technology, the claw-shaped magnetic pole portion surface area As is set to such a value as to allow the field magnetic flux to sufficiently flow. According to the prior art, the main function of permanent magnets is to suppress leakage magnetic flux between the claw-shaped magnetic pole portions. Therefore, the claw-shaped magnetic pole portion surface area As in marketed Lundell rotating electric machines with neodymium magnets has a value in proportion to the boss portion cross-sectional area Ab, i.e., in the range of As=Ab× 0.8 to 1.2 which takes Ab as a reference.

In contrast, in the present embodiment, it is possible to effectively utilize Br×(Pst/(Pst+Prt)). Since magnets of 2×Am=Ab×B50÷Br are provided for Ab×Bs, the claw-shaped magnetic pole portion surface area As of the claw-shaped magnetic pole portions 323, which perform exchange of magnetic flux with the stator 20, is required to have a value for delivering the magnetic flux of the rotor 30 to the stator 20, with the optimal value expected to be (As=Br×Am+Ab×Bs). The claw-shaped magnetic pole portion surface area As of the claw-shaped magnetic pole portions 323 should be larger than Ab×1.2.

Figure 12:
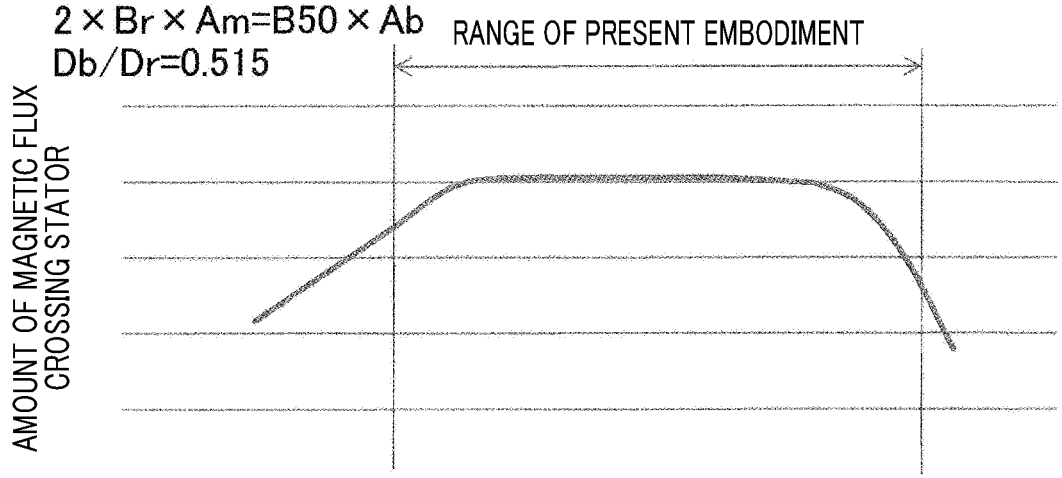
FIG. 12 is a schematic view illustrating the relationship between the ratio As/Ab between the surface area As of each claw-shaped magnetic pole portion and the magnetic path cross-sectional area Ab of boss portions and the amount of magnetic flux crossing the stator when the stator is loaded in the rotating electric machine according to the embodiment.
Figure 12:
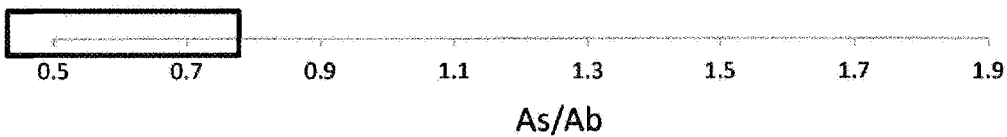

Hereinafter, investigation is made on condition that B50× Ab=2×Br×Am. This means that the field circuit is set to dimensions capable of confining the magnet magnetic flux. In this case, the relationship between the ratio As/Ab between the claw-shaped magnetic pole portion surface area As and the boss portion cross-sectional area Ab and the amount of magnetic flux crossing the stator 20 when the stator 20 is loaded is shown in FIG. 12. As seen from FIG. 12, the amount of magnetic flux crossing the stator 20 reaches its peak when As/Ab is approximately in the range of 1.0-1.5. Moreover, the range of As/Ab=0.9-1.7 can be regarded as a preferable range. In addition, the range of As/Ab according to the prior art (see, for example, Japanese Patent Application Publication No. JPH04255451A) is 0.4-0.8, which deviates from, without overlapping, the above preferable range of As/Ab according to the present embodiment.

Figure 13:
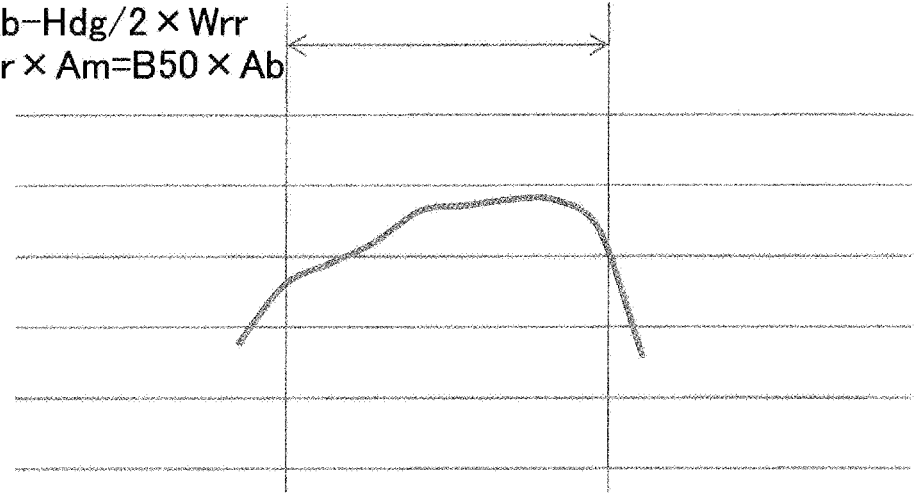
FIG. 13 is a schematic view illustrating the relationship between the ratio Db/Dr between the outer diameter Db of the boss portions and the outer diameter Dr of the rotor and the amount of magnetic flux crossing the stator when the stator is loaded in the rotating electric machine according to the embodiment.
Figure 13:
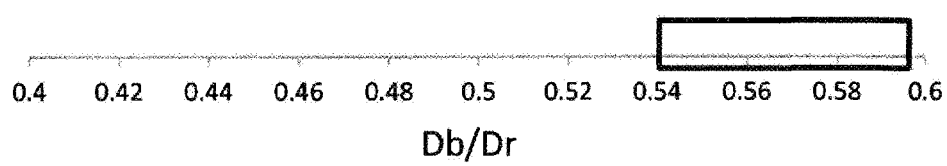

Here, the investigation is continued on condition that: As/Ab=1.4; the amount of field magnetic flux and the amount of suppressed magnet magnetic flux are suitable; and magnet utilization at the same level as in an IPM rotor is possible. Specifically, the optimal value of the boss portion outer diameter Db is investigated. FIG. 13 shows the relationship between the ratio Db/Dr between the boss portion outer diameter Db and the rotor outer diameter Dr and the amount of magnetic flux crossing the stator 20 when the stator 20 is loaded. As seen from FIG. 13, the amount of magnetic flux crossing the stator 20 reaches its peak when Db/Dr is in the vicinity of 0.51. Moreover, the range of Db/Dr=0.46-0.53 can be regarded as a preferable range. In addition, the range of Db/Dr according to the prior art (see, for example, Japanese Patent Application Publication No. JPH04255451A) is 0.54-0.595, which deviates from, without overlapping, the above preferable range of Db/Dr according to the present embodiment.

Figure 14:
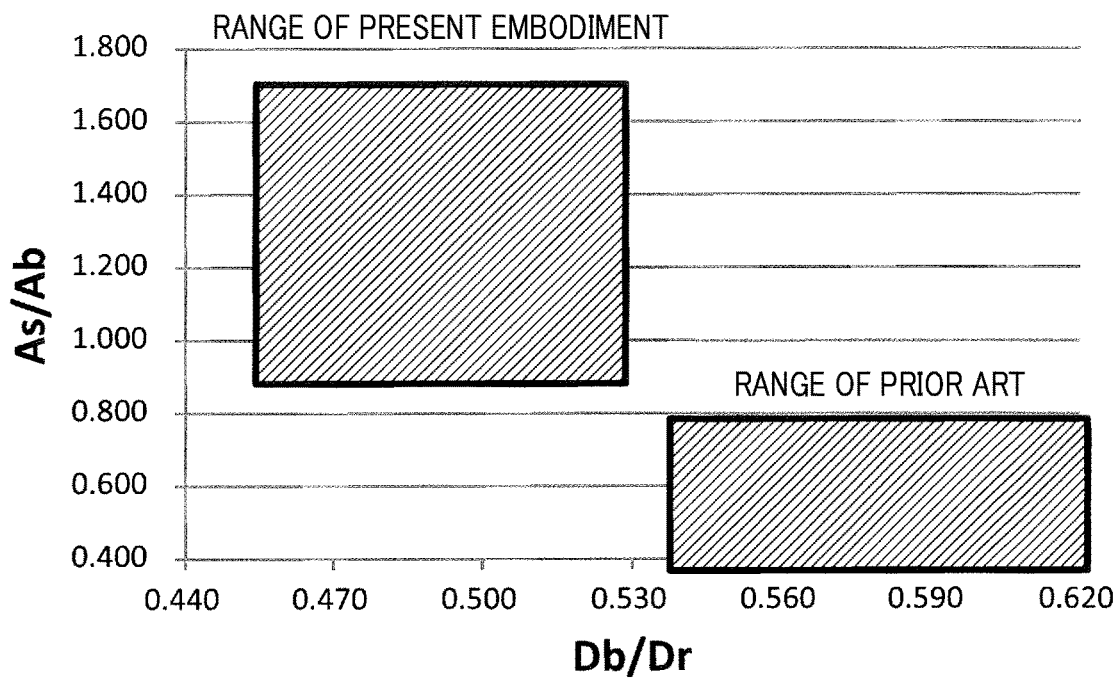
FIG. 14 is a schematic view illustrating the relationship between the ratio As/Ab between the surface area As of each claw-shaped magnetic pole portion and the magnetic path cross-sectional area Ab of the boss portions and the ratio Db/Dr between the outer diameter Db of the boss portions and the outer diameter Dr of the rotor in the rotating electric machine according to the embodiment.

FIG. 14 shows the relationship between the ratio As/Ab between the claw-shaped magnetic pole portion surface area As and the boss portion cross-sectional area Ab and the ratio Db/Dr between the boss portion outer diameter Db and the rotor outer diameter Dr. As seen from FIG. 14, the ranges of As/Ab and Db/Dr according to the present embodiment deviate from, without overlapping, those according to the prior art.

The larger the value of B50×Ab=2×Br×Am, the larger effects can be achieved. Therefore, the present investigation is made on the assumption that Br=1.2 T. It is clear that the material with which the maximum effects can be achieved is not Fe magnets whose Br is about 0.4 T, but neodymium magnets whose Br is higher than or equal to 1 T. Moreover, since the boss portion cross-sectional area Ab is reduced, it is possible to utilize the space, which results from the reduction in Ab, for lowering the resistance of the field coil 33, thereby reducing the amount of heat generated by the field coil 33 in comparison with the prior art.

(Operation and Effects)

In the rotating electric machine 1 according to the present embodiment, by the magnetic force of each of the permanent magnets 34 which is arranged between one circumferentially-adjacent pair of the claw-shaped magnetic pole portions 323, there are formed the two magnet magnetic circuits, i.e., the first magnet magnetic circuit 62 along which the magnetic flux flows to cross the stator 20 and the second magnet magnetic circuit 63 along which the magnetic flux flows to circulate within the rotor 30 through the boss portions 321. Moreover, when the rotor 30 is loaded, i.e., when the field current If is supplied to the field coil 33, there is formed the d-axis magnetic circuit 60 along which the magnetic flux generated by the magnetomotive force of the field coil 33 flows through the boss portions 321 of the field core 32, one pair of the claw-shaped magnetic pole portions 323 and the stator core 21. At this time, of the two magnet magnetic circuits 62 and 63, the direction of the magnet magnetic flux flowing along the second magnet magnetic circuit 63 is opposite to the direction of the magnetic flux flowing along the d-axis magnetic circuit 60; therefore, the reluctance of the second magnet magnetic circuit 63 is high and thus it is difficult for the magnet magnetic flux to flow through the second magnet magnetic circuit 63.

In the present embodiment, the permeance Prt of the d-axis magnetic circuit 60 and the permeance Pst of the q-axis magnetic circuit 61 are set to satisfy the relationship of Pst>Prt. That is, the permeance Prt of the d-axis magnetic circuit 60 is lower than the permeance Pst of the q-axis magnetic circuit 61. Therefore, of the two magnet magnetic circuits 62 and 63, the magnet magnetic flux flowing along the first magnet magnetic circuit 62 to cross the stator 20 is increased. Consequently, it becomes possible to effectively utilize the magnet magnetic flux, thereby significantly improving the electric power generation capability.

Moreover, in the present embodiment, the ring member 35 is fixed to the radially inner parts of the claw-shaped magnetic pole portions 323 of the field core 32 which face the boss portions 321. The ring member 35 supports all the claw-shaped magnetic pole portions 323 from the radially inner side. Therefore, with the ring member 35, it is possible to suppress deformation in which the claw-shaped magnetic pole portions 323 of the field core 32 are moved radially outward due to the centrifugal force generated during rotation of the rotor 30. Accordingly, with the ring member 35, it is possible to lower the rigidity of supporting the claw-shaped magnetic pole portions 323 by the boss portions 321 and the disc portions 322 while suppressing deformation of the claw-shaped magnetic pole portions 323. That is, since the resistance to the centrifugal force acting on the claw-shaped magnetic pole portions 323 and the permanent magnets 34 can be improved, it is possible to prevent occurrence of performance degradation even if the rigidity of supporting the claw-shaped magnetic pole portions 323 by the boss portions 321 and the disc portions 322 is lowered. Consequently, it is possible to prevent the size of the rotor 30 and thus the size of the rotating electric machine 1 from being increased with enhancement of the rigidity of supporting the claw-shaped magnetic pole portions 323 by the boss portions 321 and the disc portions 322.

Moreover, in the present embodiment, the boss portion cross-sectional area Ab of the boss portions 321 per pair of N and S magnetic poles, the magnetic flux density B50 when magnetic field of 5000 A/m is applied to the boss portions 321, the residual magnetic flux density Br of the permanent magnets 34, and the magnetic path cross-sectional area Am of each magnetic pole portion (i.e., the area of each of the surfaces constituting the magnetic poles) of the permanent magnets 34 are set to satisfy the relationship of 2×Br [T]×Am [mm$^2$]<B50 [T]×Ab [mm$^2$]. Consequently, it becomes possible for the magnetic force generated by each of the permanent magnets 34 to be absorbed by the d-axis magnetic circuit 60. That is, it becomes possible to lower the counterelectromotive force, thereby suppressing electric power generated in a high-speed rotation state during non-energization.

Moreover, in the present embodiment, the permeance Prt of the d-axis magnetic circuit 60 and the permeance Pst of the q-axis magnetic circuit 61 are set to satisfy the relationship of Pst:Prt=2n:1 (where n is a real number greater than or equal to 1). Consequently, it becomes possible to make the mode of the rotor 30, which is a Lundell rotor, when loaded approach the mode of an IPM rotor; thus it becomes possible to make the salient pole ratio ρ, which is the ratio Lq/Ld between the q-axis inductance Lq and the d-axis inductance Ld, greater than or equal to 2. As a result, it becomes possible for the Lundell rotor to output reluctance torque at the same level as that outputted by an IPM rotor.

Moreover, in the present embodiment, the claw-shaped magnetic pole portion surface area As and the boss portion cross-sectional area Ab are set to satisfy the relationship of 0.9<As/Ab<1.7. Moreover, the claw-shaped magnetic pole portion surface area As and the disc portion cross-sectional area Ad are set to satisfy the relationship of 0.9<As/Ad<1.7. Consequently, in the present embodiment, it becomes possible to use the permanent magnets 35, which have conventionally been used for rectification or leakage prevention of magnetic flux between the adjacent claw-shaped magnetic pole portions 323, similarly to permanent magnets of an IPM rotor. In other words, it becomes possible to use the permanent magnets 34 not only as leakage prevention means, but also as magnetic flux increasing means, i.e., as torque increasing means and output increasing means.

Moreover, in the present embodiment, the boss portion outer diameter Db and the rotor outer diameter Dr are set to satisfy the relationship of 0.46<Db/Dr<0.53. That is, the boss portion cross-sectional area Ab is in a range determined by fully considering the reaction of the magnet magnetic force to the magnetic force of the boss portions. Consequently, when the magnetic force of the boss portions 321, which can repel the reaction by the magnet magnetic force, acts on the field core 32, it is possible to transfer both the total magnetic force of the boss portions 321 and the total magnetic force of the magnets to the stator 20 side.

Moreover, in the present embodiment, the residual magnetic flux density Br of the permanent magnets 34 is set to be higher than or equal to 1 T. In the case of the magnet magnetic force being generated by neodymium-iron-boron bonded magnets or plastic molded magnets formed by samarium-iron-nitrogen injection molding, it may be impossible to sufficiently supply the demagnetizing magnetic field to the field core 32. That is, in the case of designing the rotor 30 without changing its volume, if the cross-sectional area of the magnets was increased, it might become impossible to secure the space of the field coil 33. Therefore, the above-described operation and effects can be effectively achieved particularly when the residual magnetic flux density Br of the permanent magnets 34 is higher than or equal to 1 T. Of course, the problem may be easily solved by increasing the size of the machine; however, in this case, the mounting difficulty would be increased, thereby lowering the competitiveness of the machine.

Moreover, in the present embodiment, the portions of the field core 32 where the d-axis magnetic circuit 60 is formed are formed of two types of materials having different saturation flux densities Bs. That is, the claw-shaped magnetic pole portions 323 are formed of a material having relatively high saturation flux density Bs whereas the boss portions 321 and the disc portions 322 are formed of a material having relatively low saturation flux density Bs. Consequently, the boss portions 321 can be immediately magnetically saturated and thus the behavior of magnetic flux characteristics of the rotor 30 can be easily changed to that of an IPM rotor. As a result, it is possible to more reliably improve the electric power generation capability of the rotating electric machine 1.

Moreover, in the present embodiment, the material of low saturation flux density Bs used for forming the boss portions 321 and the disc portions 322 is higher in magnetic permeability than the material of high saturation flux density Bs used for forming the claw-shaped magnetic pole portions 323. Consequently, it becomes possible to improve the capability of absorbing the counterelectromotive force when no load is applied to the rotor 30.

Other Embodiments

In addition, the present disclosure is not limited to the above-described embodiment, and various modifications may be made without departing from the spirit of the present disclosure.

For example, in the above-described embodiment, the claw-shaped magnetic pole portion surface area As and the boss portion cross-sectional area Ab are set to satisfy the relationship of 0.9<As/Ab<1.7; the claw-shaped magnetic pole portion surface area As and the disc portion cross-sectional area Ad are set to satisfy the relationship of 0.9<As/Ad<1.7. However, it is also possible that only one of the above two relationships is satisfied.

Figure 15:
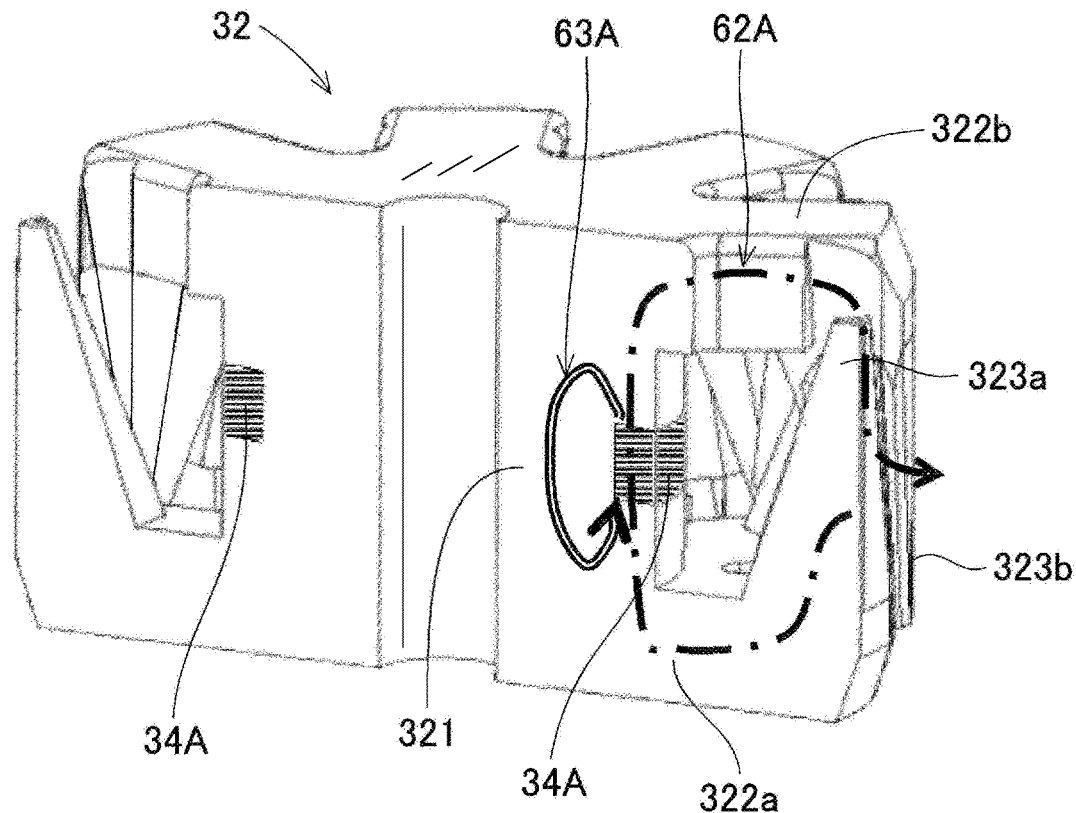
FIG. 15 is a schematic view illustrating flow of magnetic flux along a magnet magnetic circuit formed in a rotating electric machine according to a modification.

Moreover, in the above-described embodiment, the d-axis magnetic circuit 60 and the first magnet magnetic circuit 62 are partially coincident with each other; the d-axis magnetic circuit 60 and the second magnet magnetic circuit 63 are also partially coincident with each other. However, by embedding or arranging the permanent magnets 34 in the d-axis magnetic circuit 60, it is possible to make the d-axis magnetic circuit 60 and the first magnet magnetic 62 entirely coincident with each other or the d-axis magnetic circuit 60 and the second magnet magnetic circuit 63 entirely coincident with each other. For example, as shown in FIG. 15, a cylindrical permanent magnet 34A, which has magnetic poles formed at both axial end portions thereof, may be coaxially mounted on the radially outer peripheries of the boss portions 321 of the field core 32 where the d-axis magnetic circuit 60 is formed. With this structure, the d-axis magnetic circuit 60 (see FIGS. 8 and 9) and a first magnet magnetic circuit 62A become entirely coincident with each other. In addition, in this case, the magnetic path cross-sectional area Ab of the boss portions 321 per pair of N and S magnetic poles can be expressed as A/P, where A is the total cross-sectional area of the magnetic path of that part of the boss portions 321 on which the permanent magnet 34A is mounted, and P is the pole pair number of the rotating electric machine.

Moreover, permanent magnets may be embedded or arranged in the disc portions 322a and 322b of the field core 32 where the d-axis magnetic circuit 60 is formed. In this structure, the cross-sectional area of the disc portions 322a and 322b is represented by the cross-sectional area of that part (disc portion core part) of the disc portions 322a and 322b in which the permanent magnets are provided.

Moreover, in the above-described embodiment, the present disclosure is applied to the rotating electric machine 1 that is configured as a motor-generator for a vehicle. However, the present disclosure can also be applied to other rotating electric machines, such as an electric motor or an electric generator.

What is claimed is:

1. A rotating electric machine comprising:
a stator including an annular stator core and a stator coil wound on the stator core; and
a rotor arranged radially inside the stator to radially face the stator,
wherein
the rotor includes:
a field core having at least one cylindrical boss portion fixed on a rotating shaft, a pair of disc portions extending radially outward respectively from two axial end parts of the at least one boss portion, and a plurality of claw-shaped magnetic pole portions each axially extending from a radially outer end part of a corresponding one of the disc portions and located radially outside the at least one boss portion, the claw-shaped magnetic pole portions respectively forming magnetic poles polarities of which are alternately different in a circumferential direction;
a field coil arranged between the at least one boss portion and the claw-shaped magnetic pole portions to generate magnetomotive force upon being energized;
a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions due to the magnetomotive force of the field coil; and
a ring-shaped fixing member fixed to radially inner parts of the claw-shaped magnetic pole portions, which face the at least one boss portion, to support the claw-shaped magnetic pole portions from a radially inner side,
wherein
a d-axis magnetic circuit and a magnet magnetic circuit are at least partially coincident with each other to share a common circuit portion,
along the d-axis magnetic circuit, magnetic flux generated by the magnetomotive force of the field coil flows through the at least one boss portion, the disc portions, one pair of the claw-shaped magnetic pole portions and the stator core,
along the magnet magnetic circuit, magnetic flux generated by magnetic force of a corresponding one of the permanent magnets flows, the rotating electric machine is configured so that when field current is supplied to the field coil, permeance of the d-axis magnetic circuit is lower than permeance of a q-axis magnetic circuit,
along the q-axis magnetic circuit, magnetic flux generated during energization of the stator coil flows through a q axis that is located at a position offset from a d axis by 90° in electrical angle.

2. The rotating electric machine as set forth in claim 1, wherein the permeance Prt of the d-axis magnetic circuit and the permeance Pst of the q-axis magnetic circuit are set to satisfy a relationship of Pst:Prt=2n:1 (where n is a real number greater than or equal to 1) when the field current is supplied to the field coil.

3. A rotating electric machine comprising:
a stator including an annular stator core and a stator coil wound on the stator core; and
a rotor arranged radially inside the stator to radially face the stator,
wherein
the rotor includes:
a field core having at least one cylindrical boss portion fixed on a rotating shaft, a pair of disc portions extending radially outward respectively from two axial end parts of the at least one boss portion, and a plurality of claw-shaped magnetic pole portions each axially extending from a radially outer end part of a corresponding one of the disc portions and located radially outside the at least one boss portion, the claw-shaped magnetic pole portions respectively forming magnetic poles polarities of which are alternately different in a circumferential direction;
a field coil arranged between the at least one boss portion and the claw-shaped magnetic pole portions to generate magnetomotive force upon being energized;
a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions due to the magnetomotive force of the field coil; and
a ring-shaped fixing member fixed to radially inner parts of the claw-shaped magnetic pole portions, which face the at least one boss portion, to support the claw-shaped magnetic pole portions from a radially inner side,
wherein
a surface area As of a radially outer surface of each of the claw-shaped magnetic pole portions and a magnetic path cross-sectional area Ab of the at least one boss portion per pair of N and S magnetic poles are set to satisfy a relationship of 0.9<As/Ab<1.7.

4. The rotating electric machine as set forth in claim 3, wherein an outer diameter Db of the at least one boss portion and an outer diameter Dr of the rotor are set to satisfy a relationship of 0.46<Db/Dr<0.53.

5. A rotating electric machine comprising:
a stator including an annular stator core and a stator coil wound on the stator core; and
a rotor arranged radially inside the stator to radially face the stator,
wherein
the rotor includes:
a field core having at least one cylindrical boss portion fixed on a rotating shaft, a pair of disc portions extending radially outward respectively from two axial end parts of the at least one boss portion, and a plurality of claw-shaped magnetic pole portions each axially extending from a radially outer end part of a corresponding one of the disc portions and located radially outside the at least one boss portion, the claw-shaped magnetic pole portions respectively forming magnetic poles polarities of which are alternately different in a circumferential direction;

a field coil arranged between the at least one boss portion and the claw-shaped magnetic pole portions to generate magnetomotive force upon being energized;

a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions due to the magnetomotive force of the field coil; and a ring-shaped fixing member fixed to radially inner parts of the claw-shaped magnetic pole portions, which face the at least one boss portion, to support the claw-shaped magnetic pole portions from a radially inner side, wherein a surface area As of a radially outer surface of each of the claw-shaped magnetic pole portions and a magnetic path cross-sectional area Ad of each of the disc portions per claw-shaped magnetic pole portion are set to satisfy a relationship of $0.9<As/Ad<1.7$.

6. The rotating electric machine as set forth in claim 5, wherein residual magnetic flux density of the permanent magnets is higher than or equal to 1 T.

7. The rotating electric machine as set forth in claim 5, wherein the magnetic path cross-sectional area Ab of the at least one boss portion per pair of N and S magnetic poles, magnetic flux density B50 when magnetic field of 5000 A/m is applied to the at least one boss portion, the residual magnetic flux density Br of the permanent magnets, and a magnetic path cross-sectional area Am of each of the permanent magnets are set to satisfy a relationship of $2 \times Br \times Am < B50 \times Ab$.

8. The rotating electric machine as set forth in claim 5, wherein the claw-shaped magnetic pole portions of the field core are formed of a first material, and the at least one boss portion and the disc portions of the field core are formed of a second material that is lower in saturation flux density than the first material.

9. The rotating electric machine as set forth in claim 8, wherein the second material is higher in magnetic permeability than the first material.

10. The rotating electric machine as set forth in claim 5, wherein the fixing member is formed in an annular shape such that outer diameters of fixing portions of the fixing member, which are respectively fixed to the claw-shaped magnetic pole portions, are constant over an entire circumferential range of the fixing member.

11. A rotating electric machine comprising:

a stator including an annular stator core and a stator coil wound on the stator core; and a rotor arranged radially inside the stator to radially face the stator, wherein the rotor includes:

a field core having at least one cylindrical boss portion fixed on a rotating shaft, a pair of disc portions extending radially outward respectively from two axial end parts of the at least one boss portion, and a plurality of claw-shaped magnetic pole portions each axially extending from a radially outer end part of a corresponding one of the disc portions and located radially outside the at least one boss portion, the claw-shaped magnetic pole portions respectively forming magnetic poles polarities of which are alternately different in a circumferential direction;

a field coil arranged between the at least one boss portion and the claw-shaped magnetic pole portions to generate magnetomotive force upon being energized;

a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions due to the magnetomotive force of the field coil; and a ring-shaped fixing member fixed to radially inner parts of the claw-shaped magnetic pole portions, which face the at least one boss portion, to support the claw-shaped magnetic pole portions from a radially inner side.

12. The rotating electric machine as set forth in claim 3, wherein residual magnetic flux density of the permanent magnets is higher than or equal to 1 T.

13. The rotating electric machine as set forth in claim 1, wherein the magnetic path cross-sectional area Ab of the at least one boss portion per pair of N and S magnetic poles, magnetic flux density B50 when magnetic field of 5000 A/m is applied to the at least one boss portion, the residual magnetic flux density Br of the permanent magnets, and a magnetic path cross-sectional area Am of each of the permanent magnets are set to satisfy a relationship of $2 \times Br \times Am < B50 \times Ab$.

14. The rotating electric machine as set forth in claim 3, wherein the magnetic path cross-sectional area Ab of the at least one boss portion per pair of N and S magnetic poles, magnetic flux density B50 when magnetic field of 5000 A/m is applied to the at least one boss portion, the residual magnetic flux density Br of the permanent magnets, and a magnetic path cross-sectional area Am of each of the permanent magnets are set to satisfy a relationship of $2 \times Br \times Am < B50 \times Ab$.

15. The rotating electric machine as set forth in claim 1, wherein the claw-shaped magnetic pole portions of the field core are formed of a first material, and the at least one boss portion and the disc portions of the field core are formed of a second material that is lower in saturation flux density than the first material.

16. The rotating electric machine as set forth in claim 15, wherein the second material is higher in magnetic permeability than the first material.

17. The rotating electric machine as set forth in claim 3, wherein the claw-shaped magnetic pole portions of the field core are formed of a first material, and the at least one boss portion and the disc portions of the field core are formed of a second material that is lower in saturation flux density than the first material.

18. The rotating electric machine as set forth in claim 17, wherein the second material is higher in magnetic permeability than the first material.

19. The rotating electric machine as set forth in claim 1, wherein the fixing member is formed in an annular shape such that outer diameters of fixing portions of the fixing member, which are respectively fixed to the claw-shaped magnetic pole portions, are constant over an entire circumferential range of the fixing member.

20. The rotating electric machine as set forth in claim 3, wherein the fixing member is formed in an annular shape such that outer diameters of fixing portions of the fixing member, which are respectively fixed to the claw-shaped magnetic pole portions, are constant over an entire circumferential range of the fixing member.

* * * * *